US012792134B2

(12) United States Patent
Woo et al.

(10) Patent No.: US 12,792,134 B2
(45) Date of Patent: Nov. 10, 2026

(54) ELECTRONIC DEVICE AND OPERATION METHOD THEREOF

(71) Applicant: Samsung Electronics Co., Ltd., Suwon-si (KR)

(72) Inventors: Hyuntaek Woo, Suwon-si (KR); Jinmo Kang, Suwon-si (KR); Beomsu Kim, Suwon-si (KR); Gunhee Lee, Suwon-si (KR); Daiwoong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/809,907

(22) Filed: Aug. 20, 2024

(65) Prior Publication Data

US 2024/0411359 A1 Dec. 12, 2024

Related U.S. Application Data

(63) Continuation of application No. PCT/KR2023/001985, filed on Feb. 10, 2023.

(30) Foreign Application Priority Data

Feb. 21, 2022 (KR) ........................ 10-2022-0022546
May 11, 2022 (KR) ........................ 10-2022-0057873

(51) Int. Cl.
*G06F 3/01* (2006.01)
*G06F 3/04886* (2022.01)
(Continued)

(52) U.S. Cl.
CPC .............. *G06F 3/011* (2013.01); *G06F 3/017* (2013.01); *G06F 3/04886* (2013.01); *G06T 7/70* (2017.01);
(Continued)

(58) Field of Classification Search
CPC ...... G06F 3/011; G06F 3/017; G06F 3/04886; G06F 1/163; G06F 3/0482;
(Continued)

(56) References Cited

U.S. PATENT DOCUMENTS 10,304,248 B2 5/2019 Woo et al.
10,860,136 B2 12/2020 Sugimoto et al.
(Continued)

FOREIGN PATENT DOCUMENTS

EP 2 985 678 B1 2/2016
JP H07-5971 A 1/1995
(Continued)

OTHER PUBLICATIONS

International Search Report and written opinion dated May 12, 2023, issued in International Patent Application No. PCT/KR2023/001985.

(Continued)

*Primary Examiner* — Matthew A Eason
*Assistant Examiner* — Chayce R Bibbee
(74) *Attorney, Agent, or Firm* — Jefferson IP Law, LLP

(57) ABSTRACT

An electronic device that is an augmented reality (AR) device is provided. The electronic device includes sensor circuitry configured to recognize a user's finger. memory storing one or more computer programs, and one or more processors communicatively coupled to the sensor circuitry and the memory, wherein the one or more computer programs include computer-executable instructions that, when executed by the one or more processors individually or collectively, cause the electronic device to, after a result of recognizing the user's finger is received from the sensor circuitry, determine whether there is accuracy correction data of coordinates of the user's finger, when there is the accuracy correction data of the coordinates of the user's
(Continued)

finger, correct an accuracy of the coordinates of the user's finger, when there is no accuracy correction data of the coordinates of the user's finger, recognize the user's finger in an image obtained by the sensor circuitry and calculate the coordinates of the user's finger in the AR environment based on data of the user's finger, and correct the coordinates of the user's finger in the AR environment.

20 Claims, 16 Drawing Sheets

(51) Int. Cl.
*G06T 7/70* (2017.01)
*G06V 40/10* (2022.01)

(52) U.S. Cl.
CPC .. *G06V 40/107* (2022.01); *G06T 2207/30196* (2013.01)

(58) Field of Classification Search
CPC ..... G06F 3/04842; G06F 3/0488; G06T 7/70; G06T 2207/30196; G06V 40/107; G02B 27/017
See application file for complete search history.

(56) References Cited

U.S. PATENT DOCUMENTS

| | | | | |
|---|---|---|---|---|
| 2005/0159916 | A1 * | 7/2005 | Anabuki | G06T 15/20 702/151 |
| 2009/0117951 | A1 * | 5/2009 | Alameh | H04M 1/72448 455/575.1 |
| 2012/0194561 | A1 | 8/2012 | Grossinger et al. | |
| 2015/0123895 | A1 | 5/2015 | Takano | |
| 2015/0316981 | A1 | 11/2015 | Sellen et al. | |
| 2016/0320863 | A1 * | 11/2016 | Shimoda | G06F 3/0304 |
| 2017/0154471 | A1 * | 6/2017 | Woo | G06F 3/011 |
| 2019/0004667 | A1 * | 1/2019 | Barth | G06V 20/64 |
| 2020/0089313 | A1 | 3/2020 | Himane | |
| 2021/0405758 | A1 | 12/2021 | Kim et al. | |

FOREIGN PATENT DOCUMENTS

| | | | |
|---|---|---|---|
| JP | 2005-346507 | A | 12/2005 |
| JP | 2015-90530 | A | 5/2015 |
| JP | 2021-25947 | A | 2/2021 |
| KR | 10-0934614 | B1 | 12/2009 |
| KR | 10-2016-0001699 | A | 1/2016 |
| KR | 10-2016-0047305 | A | 5/2016 |
| KR | 10-1883866 | B1 | 8/2018 |
| KR | 10-2020-0057572 | A | 5/2020 |
| KR | 10-2021-0035669 | A | 4/2021 |
| KR | 10-2289688 | B1 | 8/2021 |

OTHER PUBLICATIONS

Extended European Search Report dated Mar. 18, 2025, issued in European Application No. 23756579.1-1218.

Korean Office Action dated Jun. 11, 2026, issued in Korean Application No. 10-2022-0057873.

* cited by examiner

EXAMPLE OF PLANAR SURFACE INCLUDING NO MARKER
AND INCLUDING PICTURE FOR USER RECOGNITION

EXAMPLE OF PLANAR SURFACE IN WHICH FOUR MARKERS
AND PICTURE FOR USER RECOGNITION ARE DISPOSED

EXAMPLE OF SCREEN OF A SMART PHONE IN WHICH TWO MARKERS
AND PICTURE FOR USER RECOGNITION ARE DISPOSED

<DIAGRAM VIEWED FROM ABOVE>

<DIAGRAM VIEWED FROM SIDE>

<DIAGRAM VIEWED FROM ABOVE>

<DIAGRAM VIEWED FROM SIDE>

ELECTRONIC DEVICE AND OPERATION METHOD THEREOF

CROSS-REFERENCE TO RELATED APPLICATION(S)

This application is a continuation application, claiming priority under § 365(c), of an International application No. PCT/KR2023/001985, filed on Feb. 10, 2023, which is based on and claims the benefit of a Korean patent application number 10-2022-0022546, filed on Feb. 21, 2022, in the Korean Intellectual Property Office, and of a Korean patent application number 10-2022-0057873, filed on May 11, 2022, in the Korean Intellectual Property Office, the disclosure of each of which is incorporated by reference herein in its entirety.

BACKGROUND

1. Field

The disclosure relates to an electronic device and an operation method thereof that are capable of increasing the accuracy of a hand tracker in augmented reality (AR) and correcting data of the hand tracker (e.g., coordinates touched by the user's finger).

2. Description of Related Art

Augmented reality (AR) is one field of virtual reality (VR), and is a computer graphics technique that synthesizes virtual objects or information into real-world environments to make the synthesized objects or information appear as when they exist in the original environment. To manipulate objects in an AR environment implemented on an AR device through user input, the AR device needs to detect the user's input. In this case, the AR device may detect the user's input through physical button input, voice, hand movement, and the like. The AR device may include a hand tracker that detects hand movements in real time and enables interaction between objects in the AR environment and the user. The hand tracker may detect a position and a shape of a hand through an image or other sensors, generate data about the position, shape, motion, form, and gestures of the hand (e.g., hand gesture data) that may be used in the AR environment through various computations, such as image processing and deep learning, and transmit the generated data to the AR environment. The user may interact with various objects in the AR environment by using the hand data generated by the hand tracker.

The above information is presented as background information only to assist with an understanding of the disclosure. No determination has been made, and no assertion is made, as to whether any of the above might be applicable as prior art with regard to the disclosure.

SUMMARY

In a typical AR device, a hand tracker generates hand gesture data about a position, shape, motion, form, and gesture of a user's hand. When the hand tracker does not accurately reflect the position, shape, motion, form, and gesture of the real user's hand, the hand gesture data generated by the hand tracker may not be accurate. That is, the hand tracker may not generate hand gesture data that matches the hand shape. When the hand tracker fails to generate data that matches the user's hand shape, an operation which is not intended by the user may occur. It may also be difficult to independently measure the accuracy of the data that the hand tracker generates. The AR device obtains hand image data through sensors, and the hand tracker calculates the hand image data to generate position data in the form of coordinates for the AR environment. In this case, the position data is generated from the hand behavior, but the position data generated by the hand tracker may be inaccurate, and the AR device cannot measure the accuracy by itself, so that when there occurs a difference between the estimated position of the user's finger and the real touch position of the user's finger, the difference cannot be corrected. Methods for measuring the accuracy of the hand tracker include exploring the absolute position of the hand via motion capture or 6DoF sensors, or manually identifying the accuracy of the data for each frame. However, these methods may be time-consuming and expensive to measure accuracy.

Aspects of the disclosure are to address at least the above-mentioned problems and/or disadvantages and to provide at least the advantages described below. Accordingly, an aspect of the disclosure is to provide an AR device that measures the accuracy (e.g., error) of a hand tracker, and correct data of the hand tracker (e.g., coordinates touched by a user's finger) based on the measured error.

Additional aspects will be set forth in part in the description which follows and, in part, will be apparent from the description, or may be learned by practice of the presented embodiments.

In accordance with an aspect of the disclosure, an electronic device that is an augmented reality (AR) device is provided. The electronic device includes sensor circuitry configured to recognize a user's finger, memory storing one or more computer programs, and one or more processors communicatively coupled to the sensor circuitry and the memory, wherein the one or more computer programs include computer-executable instructions that, when executed by the one or more processors individually or collectively, cause the electronic device to, after a result of recognizing the user's finger is received from the sensor circuitry, determine whether there is accuracy correction data of coordinates of the user's finger, when there is the accuracy correction data of the coordinates of the user's finger, correct an accuracy of the coordinates of the user's finger, when there is no accuracy correction data of the coordinates of the user's finger, recognize the user's finger in an image obtained by the sensor circuitry and calculate the coordinates of the user's finger in an AR environment based on data of the user's finger, and correct the coordinates of the user's finger in the AR environment.

In accordance with another aspect of the disclosure, an operating method performed by an electronic device that provides a user with an augmented reality (AR) environment is provided. The operating method includes recognizing, by the electronic device via sensor circuitry of the electronic device, a user's finger, after receiving a result of recognizing the user's finger, determining, by the electronic device, whether there is accuracy correction data of coordinates of the user's finger, correcting, by the electronic device, the accuracy of the coordinates of the user's finger based on determining that there is the accuracy correction data of the coordinates of the user's finger, recognizing, by the electronic device, the user's finger in an image obtained by the sensor circuitry based on determining that there is no accuracy correction data of the coordinates of the user's finger and calculating, by the electronic device, the coordinates of the user's finger in the AR environment based on data of the user's finger, and correcting, by the electronic device, the coordinates of the user's finger in the AR environment.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include recognizing, by the electronic device via sensor circuitry of the electronic device, a user's finger, after receiving a result of recognizing the user's finger, determining, by the electronic device, whether there is accuracy correction data of coordinates of the user's finger, correcting, by the electronic device, the accuracy of the coordinates of the user's finger based on determining that there is the accuracy correction data of the coordinates of the user's finger, recognizing, by the electronic device, the user's finger in an image obtained by the sensor circuitry based on determining that there is no accuracy correction data of the coordinates of the user's finger and calculating, by the electronic device, the coordinates of the user's finger in an augmented reality (AR) environment based on data of the user's finger, and correcting, by the electronic device, the coordinates of the user's finger in the AR environment.

The electronic device (e.g., the AR device) according to various embodiments of the disclosure may measure the accuracy of the hand tracker on its own, without separate measurement equipment, and calculate an error between the position (e.g., the coordinates) of the real user's finger and the position (e.g., the coordinates) of the finger in the AR environment. Based on the error between the position (e.g., the coordinates) of the real user's finger and the position (e.g., the coordinates) of the finger in the AR environment, the electronic device (e.g., the AR device) may correct the position (e.g., the coordinates) of the finger in the AR environment to increase the user's AR experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular form "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
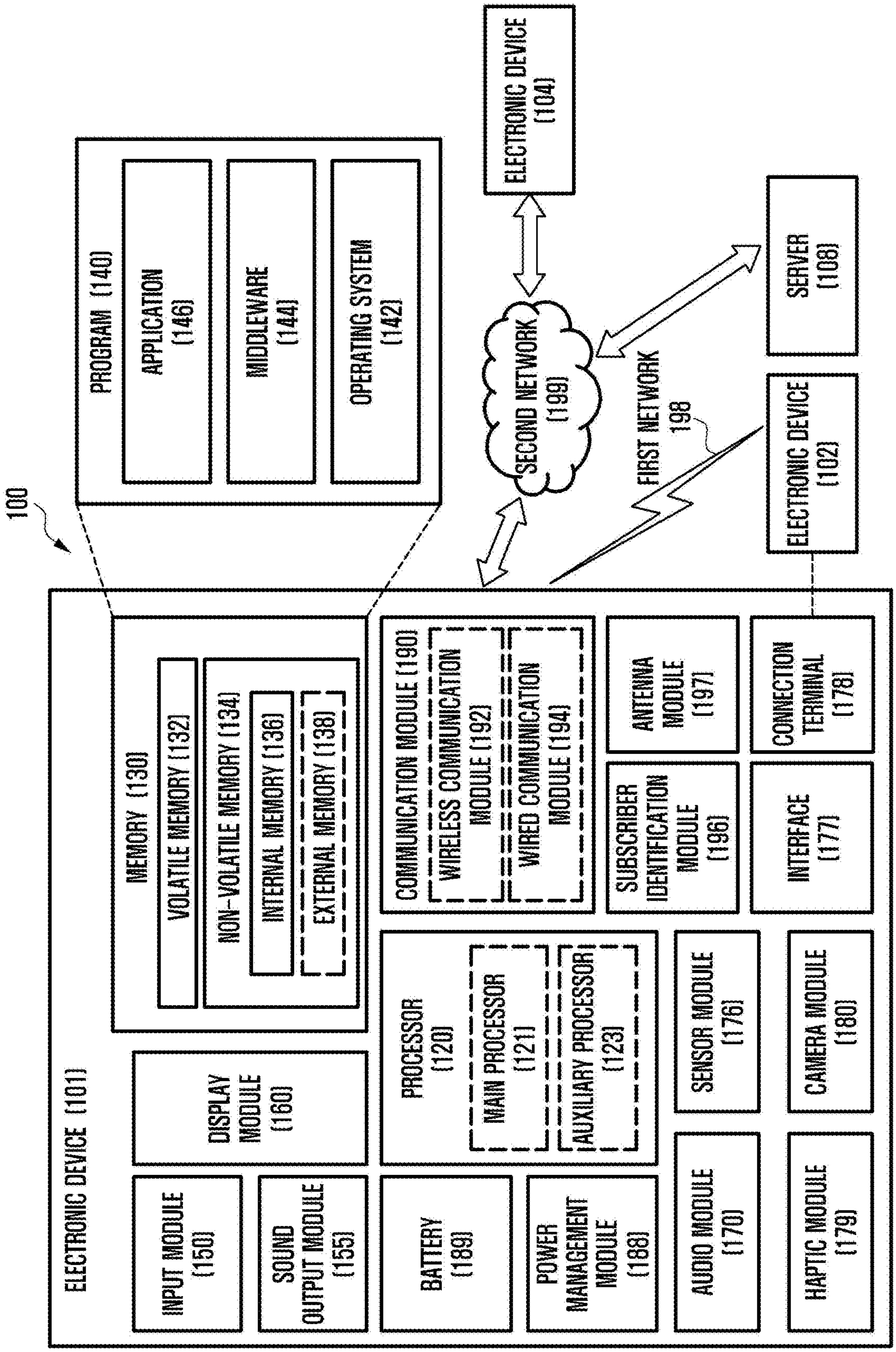
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 and the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiment, the display module 160 may include a flexible display configured to be folded or unfolded.

According to the embodiment, the display module 160 may include a flexible display that is slidably disposed to provide a screen (e.g., a display screen).

According to the embodiment, the display module 160 may also be referred to as a variable display (e.g., stretchable display), an expandable display, or a slide-out display.

According to the embodiment, the display module 160 may include a bar-type or plate-type display.

Figure 2:
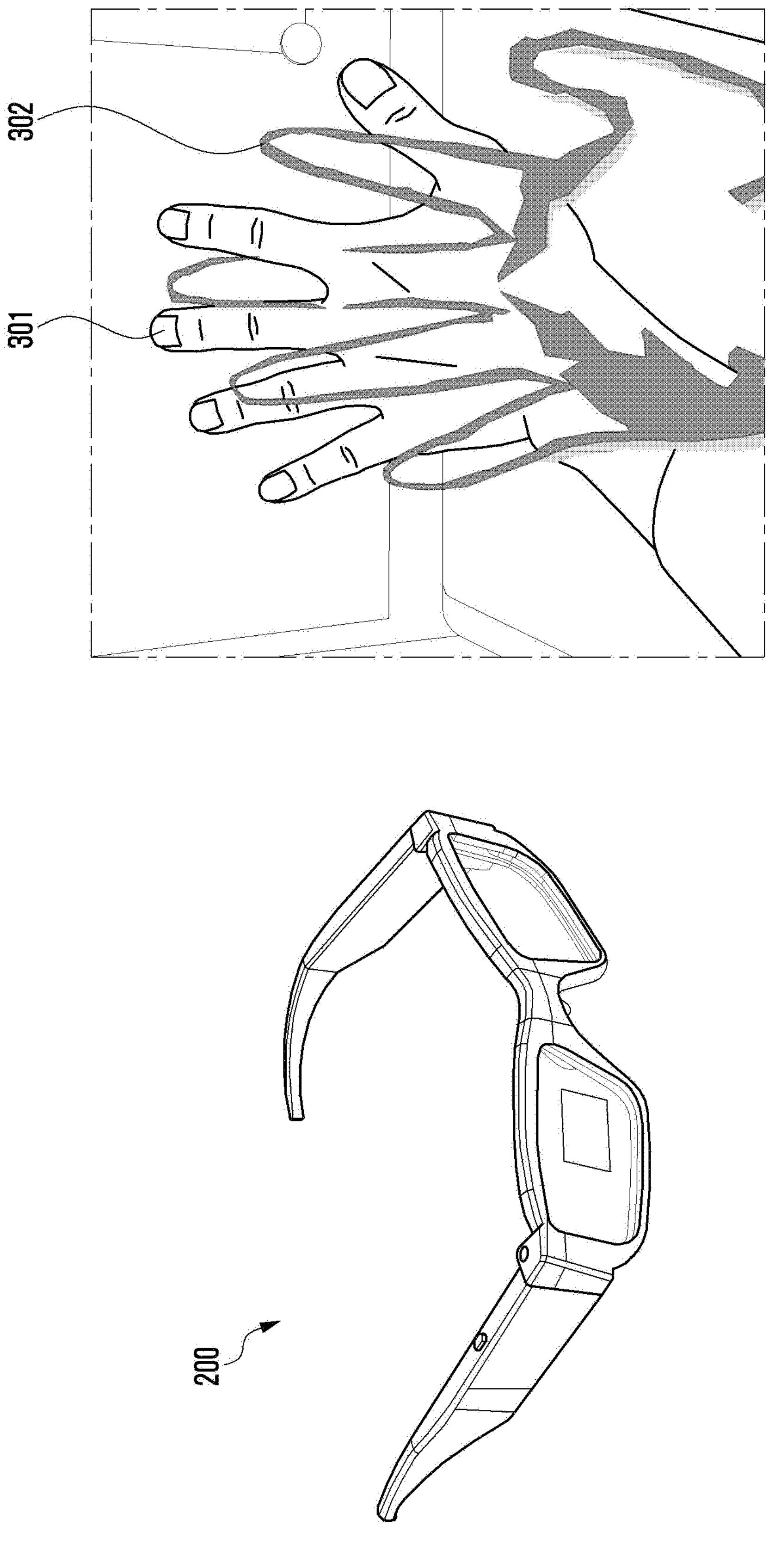
FIG. 2 is a diagram illustrating an image of a user's finger generated by an electronic device (e.g., an AR device) when a user wears the electronic device (e.g., an AR device) according to an embodiment of the disclosure.
Figure 3:
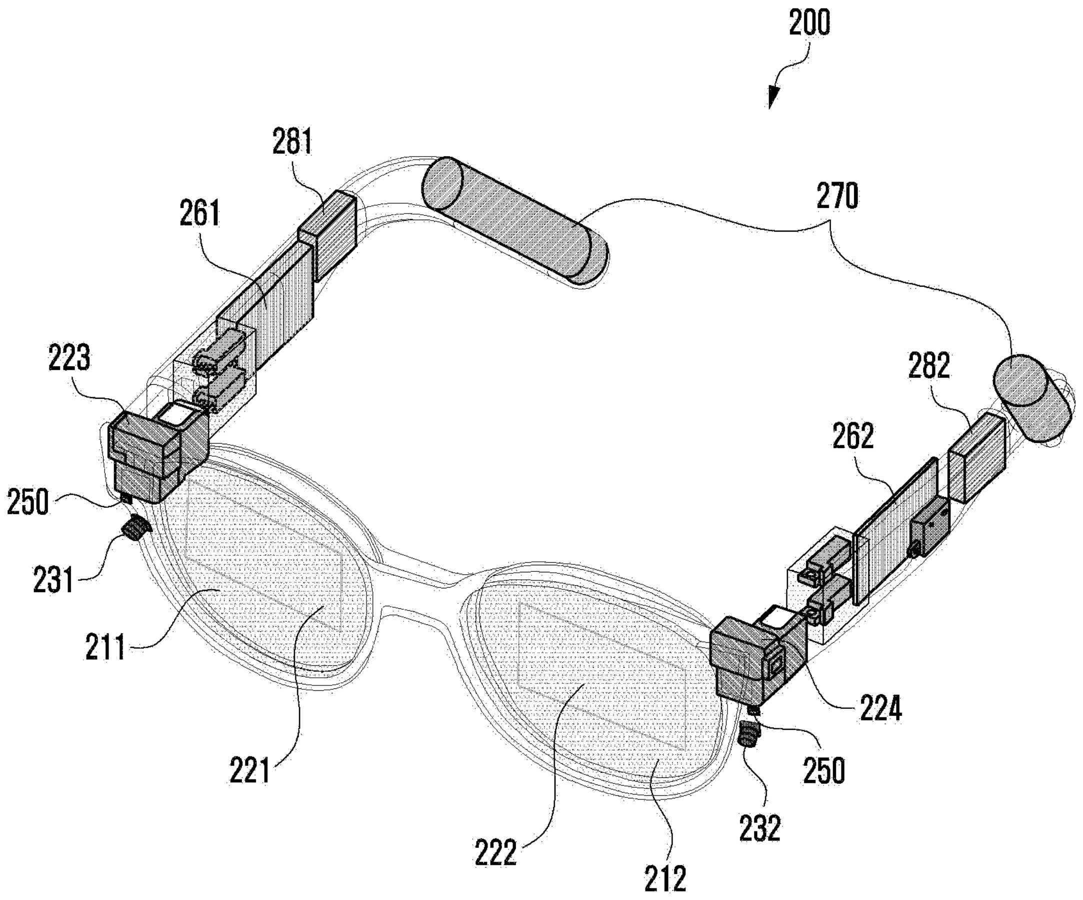
FIG. 3 is a diagram illustrating an electronic device (e.g., an AR device) according to an embodiment of the disclosure.
Figure 3:
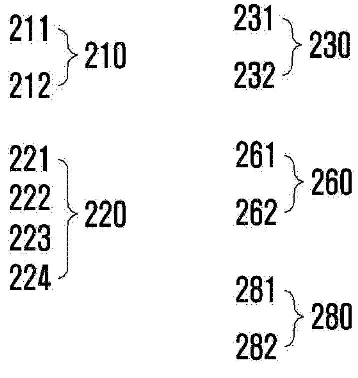

FIG. 2 is a diagram illustrating an image of a user's finger generated by an electronic device (e.g., an AR device) when a user wears the electronic device (e.g., an AR device) according to an embodiment of the disclosure. FIG. 3 is a diagram illustrating an electronic device (e.g., an AR device) according to an embodiment of the disclosure.

Referring to FIGS. 2 and 3, a user may wear an electronic device 200 (e.g., an AR device) and perform input via the user's fingers in an augmented reality (AR) environment.

In the embodiment, the electronic device 200 (e.g., the AR device) according to various embodiments of the disclosure may include augmented reality (AR) glasses. For example, the electronic device 200 may include a human mounted device (HMD).

In the embodiment, the electronic device 200 (e.g., an AR device) according to various embodiments of the disclosure may include a visor unit 210, a display unit 220, a camera unit 230 for recognition, an LED lighting 250, a PCB unit 260, a battery unit 270, and a speaker unit 280.

In the embodiment, the visor unit 210 may include a first visor 211 (e.g., a visor for the right eye), and a second visor 212 (e.g., a visor for the left eye). As an example, the visor unit 210 may be located on the front or back of the display unit 220 (e.g., a waveguide (or screen display unit)) to protect the display unit 220.

For example, the visor unit 210 may regulate the transmission of external light incident to the display unit 220 (e.g., a waveguide (or screen display unit)). The visor unit 210 may regulate the transmission of external light through an electrochromic function in which an oxidation-reduction reaction occurs to change the color by applied power.

In the embodiment, the display unit 220 may include screen display units 221 and 222 (or waveguide) and display driving units 223 and 224. As an example, the screen display units 221 and 222 may include a screen display unit 221 for the right eye and a screen display unit 222 for the left eye. For example, the screen display units 221 and 222 may include a liquid crystal display (LCD), a digital mirror device (DMD), a liquid crystal on silicon (LCoS) device, an organic light emitting diode (OLED), or a micro light emitting diode (LED). For example, when the screen display units 221 and 222 are formed of one of a liquid crystal display, a digital mirror display, or a liquid crystal on silicon device, the electronic device 200 may include a light source to emit light to an output area of the screen of the display. As another example, when the screen display units 221 and 222 are capable of generating light on their own, the screen display units 221 and 222 may provide a user with a good quality virtual image even without including a separate light source.

In the embodiment, when the screen display units 221 and 222 are implemented as organic light emitting diodes or micro LEDs, the electronic device 200 may be lightweight because a light source is not required. A user may use the electronic device 200 in the state of wearing the electronic device 200 on his/her face.

In the embodiment, the screen display units 221 and 222 may act as waveguides (e.g., waveguides) that transmits light to the user's eyes. The waveguide may be made of glass, plastic, or polymer, and may include a nanopattern formed on one internal or external surface, such as a grating structure in a polygonal or curved shape. According to the embodiment, light incident into one end of the waveguide may be propagated inside the light waveguide of the display by a nanopattern and provided to the user. Additionally, the light incident into a waveguide constituted of a free-form type prism may be provided to a user through a reflective mirror. As an example, the waveguide may include at least one of at least one diffractive element (e.g., a diffractive optical element (DOE), holographic optical element (HOE)), and reflective element (e.g., a reflective mirror). For example, the waveguide may utilize the at least one diffractive element or reflective element to guide display light emitted from the light source unit to the user's eye.

In the embodiment, the camera unit 230 for recognition may include a first camera 231 for recognition and a second camera 232 for recognition. As an example, the camera unit 230 for recognition is a camera used for head tracking, hand tracking, and spatial recognition in 3 degrees of freedom (DoF) and 6DoF, and may include a global shutter (GS) camera. The camera unit 230 for recognition may include two GS cameras (e.g., the first camera 231 for recognition and the second camera 232 for recognition), as stereo cameras are required for head tracking, hand tracking, and spatial recognition. In the embodiment, the camera unit 230 for recognition may include a sensor module for sensing an object. As an example, the sensor module may include at least one sensor. For example, the sensors may include radar sensors or lidar sensors.

In the embodiment, the LED lighting 250 may be attached to a frame of the AR glasses. The LED lighting 250 may emit infrared wavelengths. In the embodiment, the LED lighting 250 may be used as a means of supplementing ambient brightness when the surroundings are photographed with the camera unit 230 for recognition.

In the embodiment, the PCB unit 260 may be disposed on a leg part of the AR glasses and may include a first PCB 261 and a second PCB 262. As an example, the PCB unit 260 may include at least one driving unit (e.g., a processor 400 in FIG. 4) and memory (e.g., memory 440 in FIG. 4) for controlling the visor unit 210, the display unit 220, the camera unit 230 for recognition, the LED lighting 250, the speaker unit 280, and a microphone unit 590. The electrical signals may be transmitted, through the PCB unit 260, to the visor unit 210, the display unit 220, the camera unit 230 for recognition, the LED lighting 250, and the speaker unit 280.

In the embodiment, the battery unit 270 may be disposed on the leg part of the AR glasses and may include a first battery 271 and a second battery 272. Through the battery unit 270, power to drive the visor unit 210, the display unit 220, the camera unit 230 for recognition, the LED lighting 250, the PCB unit 260, and the speaker unit 280 may be supplied.

In the embodiment, the speaker unit 280 may include a first speaker 281 (e.g., a right speaker) and a second speaker 282 (e.g., a left speaker). As an example, the speaker unit 280 may output sound under control of the driving unit of the PCB unit 260. In the embodiment, In the embodiment, the electronic device 200 may further include a plurality of microphones for recognizing the user's voice and external sounds. The plurality of microphones may convert the user's voice and external sounds into electrical signals. For example, the plurality of microphones may include condenser, dynamic (moving coil and ribbon), piezoelectric element, or micro-electro mechanical systems (MEMS) microphones.

In the embodiment, the electronic device 200 (e.g., an AR device) may synthesize and display virtual objects or information, and may perform input by using a user's finger 301.

In the embodiment, the electronic device 200 (e.g., the AR device) may recognize the user's finger 301 when performing the input by using the user's finger 301. The electronic device 200 (e.g., the AR device) may display a virtual finger image 302 based on the result of recognizing the user's finger 301.

Figure 4:
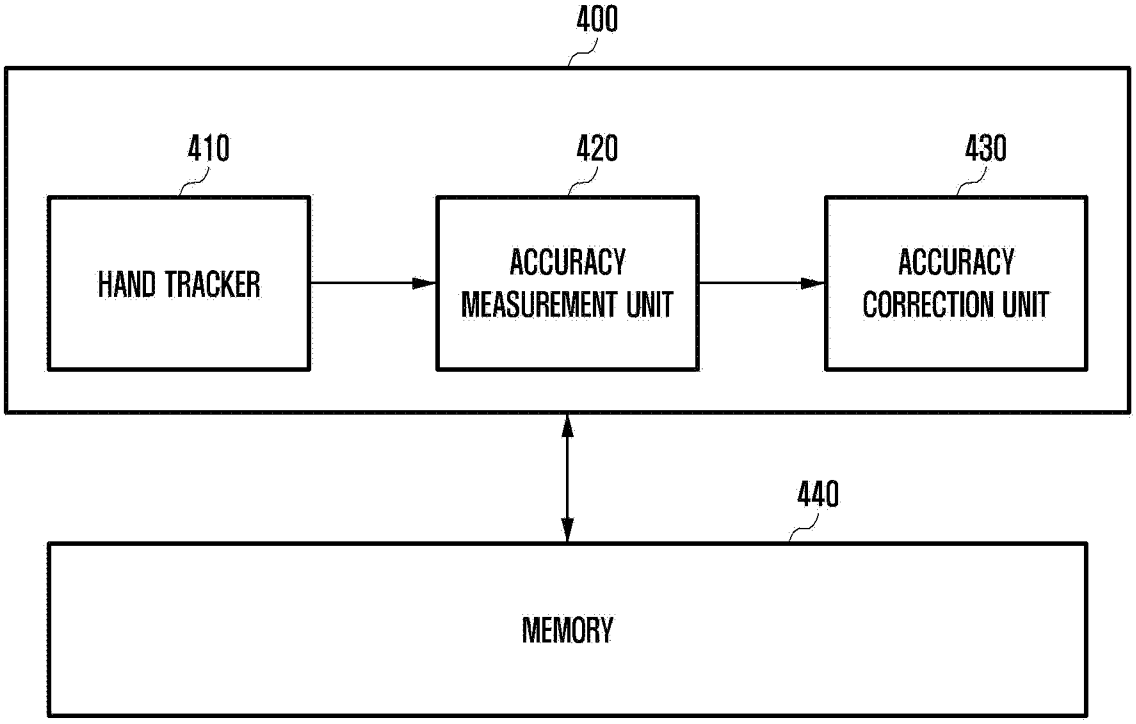
FIG. 4 is a diagram illustrating a processor and memory of an electronic device (e.g., an AR device) according to an embodiment of the disclosure.

In one example, the electronic device 200 (e.g., the AR device) may include a processor (e.g., the processor 400 in FIG. 4 (e.g., a hand tracker)) that detects a motion of the user's finger 301 in real time and generates the virtual finger image 302 to enable interaction between the user and the object in the AR environment. Interaction with various objects in the AR environment may be accomplished by using the virtual finger data (e.g., virtual finger image 302) generated by the processor 400 of the electronic device 200 (e.g., the AR device).

Figure 5:
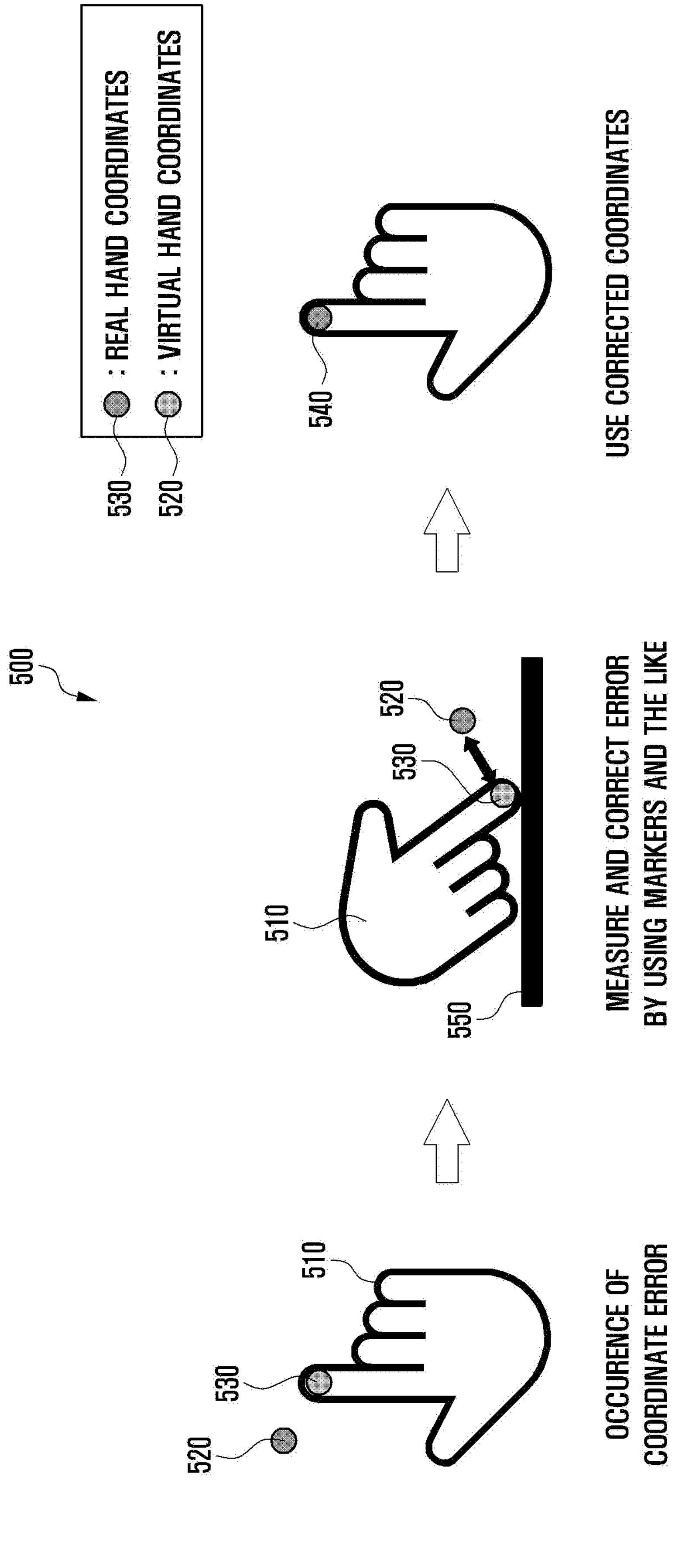
FIG. 5 is a diagram illustrating a method of correcting coordinates of a finger when an error occurs in coordinates of a user's finger according to an embodiment of the disclosure.

FIG. 4 is a diagram illustrating a processor and memory of an electronic device (e.g., an AR device) according to an embodiment of the disclosure. FIG. 5 is a diagram 500 illustrating a method of correcting coordinates of a finger when an error occurs in coordinates of a user's finger according to an embodiment of the disclosure.

Referring now to FIGS. 3, 4, and 5, an electronic device 200 (e.g., the AR device) according to various embodiments of the disclosure may include a processor 400 and memory 440. The processor 400 and the memory 440 may be operatively coupled, and a plurality of instructions for performing operations of the processor 400 may be stored in the memory 440.

According to the embodiment, the processor 400 may include a hand tracker 410, an accuracy measurement unit 420, and an accuracy correction unit 430.

In the embodiment, the hand tracker 410 may receive data about a user's hand 510 via a camera or a sensor of the electronic device 200 (e.g., the AR device). The hand tracker 410 may generate data used in the AR environment (e.g., the virtual finger image 302 in FIG. 2) based on the inputted data about the user's hand 510. As an example, an accuracy correction operation may be performed based on the presence or absence of accuracy data, and an accuracy measurement operation may be performed depending on whether the accuracy correction is required.

In the embodiment, the accuracy measurement unit 420 may measure the accuracy of the hand tracker 410. The accuracy measurement unit 420 may determine whether a position 520 of the virtual finger image (e.g., the position (e.g., coordinates) of the virtual finger image 302 in FIG. 2) matches a real user's finger position 530 (e.g., the position (e.g., coordinates) of the user's finger 301 in FIG. 2). For example, the accuracy measurement unit 420 may determine whether the position 520 (e.g., coordinates) of the virtual finger image matches the real user's finger position 530 (e.g., the coordinates) by using markers displayed on a screen of a smartphone or tablet PC, or markers displayed on a printout. For example, the plurality of markers may be displayed for correction of the position of the finger (e.g., coordinates). As an example, a picture (e.g., a touch position and at least one marker) may be displayed (or disposed) in a real-world planar space 550 (e.g., on a screen of a smartphone or tablet PC, or on a printout displaying at least one marker) that is recognizable by the electronic device 200 (e.g., the AR device), and the user may maintain the state in which a his/her finger is in contact with the picture and is fixed.

As an example, the accuracy measurement unit 420 may calculate the accuracy by calculating a difference between the coordinates of a planar contact point recognized by the electronic device 200 (e.g., the AR device) (e.g., the real user's finger position 530) and the coordinates of a planar contact point in resulting data of the hand tracker 410 (e.g., the position 520 of the virtual finger image).

In the embodiment, the accuracy correction unit 430 may obtain the AR coordinates of the user's finger and, when a certain condition is satisfied, the accuracy correction unit 430 may correct the AR coordinates of the user's finger by using the data (e.g., the difference value) obtained from the accuracy measurement unit 420 to generate final coordinates 540 of the finger. For example, the accuracy correction unit 430 may correct the difference between the real user's finger position 530 and the position 520 of the virtual finger image to generate the final coordinates 540 of the finger.

Figure 6:
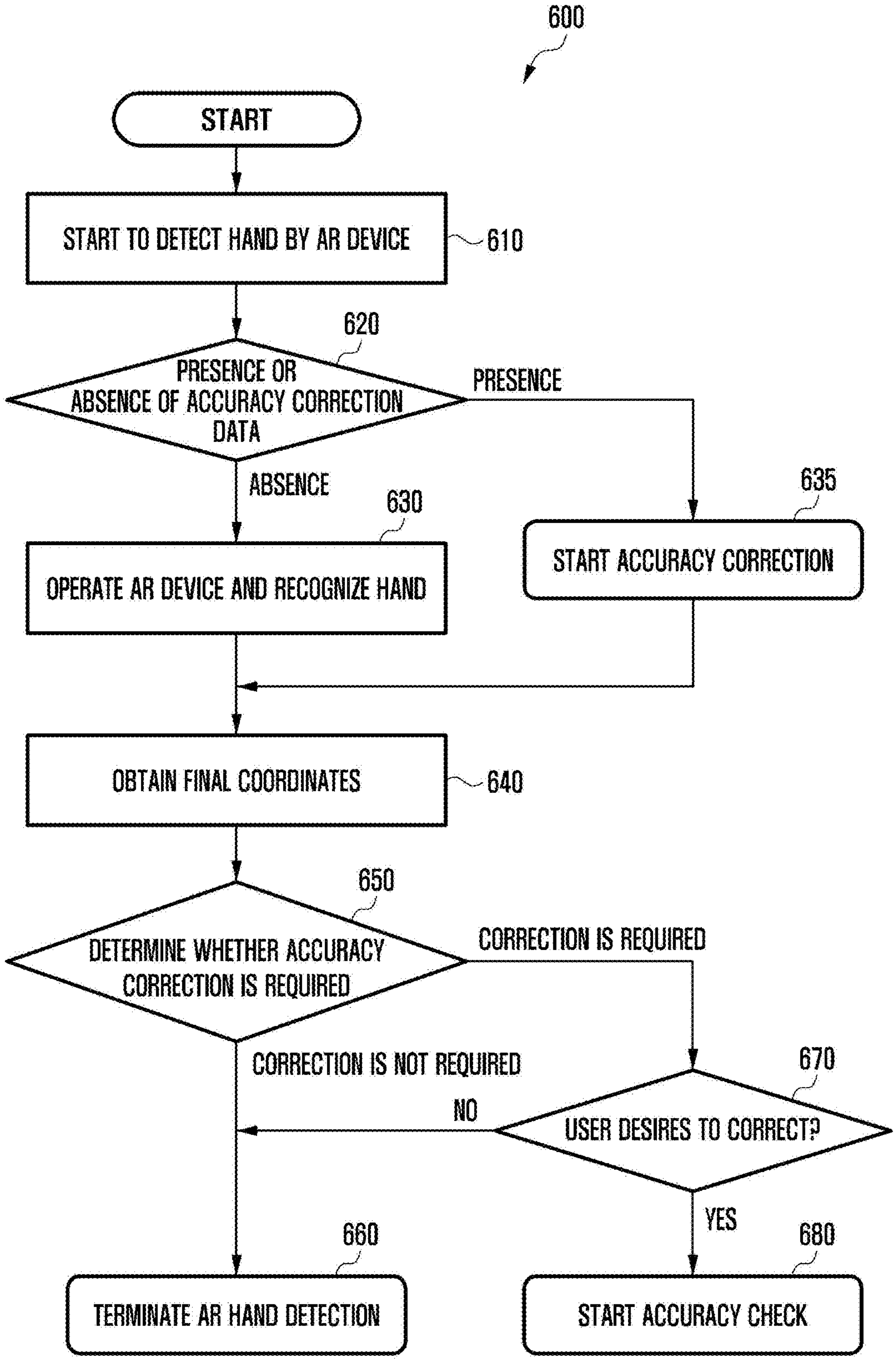
FIG. 6 is a diagram illustrating a method of detecting a hand by an electronic device (e.g., an AR device) according to embodiment of the disclosure.

FIG. 6 is a diagram 600 illustrating a method of detecting a hand by an electronic device (e.g., an AR device) according to an embodiment of the disclosure.

Referring to FIGS. 3, 4, and 6, in operation 610, a processor 400 of an electronic device 200 (e.g., the AR device) may start detecting a user's hand. For example, the hand tracker 410 may start detecting a user's hand.

In operation 620, the processor 400 may determine the presence or absence of accuracy correction data.

When the accuracy correction data is not present as a result of the determination in operation 620, in operation 630, the processor 400 may operate the electronic device (e.g., electronic device 200 of FIGS. 2 and 3) (e.g., the AR device) to recognize the user's hand (e.g., the user's hand 510 of FIG. 5) and perform recognition of the user's hand 510. For example, the hand tracker 410 may perform recognizing the user's hand 510.

For example, the processor 400 may operate the camera and/or sensors and receive data of the user's hand (e.g., an image of the user's hand) input via the camera and/or sensors.

In operation 640, the processor 400 may obtain final coordinates of the position of the user's fingers (e.g., the real user's finger position 530 in FIG. 5) based on the recognized data of the user's hand 510. For example, the hand tracker 410 may obtain the final coordinates of the position of the user's finger.

As an example, the processor 400 may calculate coordinates corresponding to the data of the hand. For example, the hand tracker 410 may calculate coordinates corresponding to the data of the hand by performing calculations, such as image processing or deep learning, based on the data of the recognized user's hand (e.g., the image of the user's hand).

When the accuracy correction data is present as a result of the determination in operation 620, in operation 635, the processor 400 may start accuracy correction of the hand tracker 410. After the accuracy correction, operation 640 may be performed.

After obtaining the final coordinates of the real user's finger position 530 in operation 640, in operation 650, the processor 400 may determine whether accuracy correction of the hand tracker 410 is required. The processor 400 may determine whether accuracy correction of the hand tracker 410 is required by comparing whether the position 520 of the virtual finger image (e.g., the position of the virtual finger image 302 in FIG. 2) matches the real user's finger position 530 (e.g., the position of the user's finger 301 in FIG. 2). A specific embodiment of the operation of determining whether accuracy correction of the hand tracker 410 is required will be described with reference to FIG. 7.

When the accuracy correction is not required as a result of the determination in operation 650, in operation 660, the processor 400 may terminate AR hand detection without correcting the accuracy of the hand tracker 410.

When the accuracy correction of the hand tracker 410 is required as a result of the determination of operation 650, in operation 670, the processor 400 may determine whether the user desires to perform the correction.

For example, the processor 400 may display a query (or a selection menu) to the user via a user interface to identify whether the user desires correction, and may determine whether the user desires the correction based on a result according to the user's selection.

When the user does not desire to perform the correction as a result of the determination in operation 670, in operation 660, the processor 400 may terminate AR hand detection without correcting the accuracy of the hand tracker 410.

When the user desires correction as a result of the determination in operation 670, in operation 680, the processor 400 may start an accuracy check of the hand tracker 410 to correct the accuracy of the hand tracker 410.

At least some of the operations illustrated in FIG. 6 may be omitted. Before or after at least some of the operations illustrated in FIG. 6, at least some of the operations described herein with reference to other drawings in the document may be added and/or inserted. All or some of the operations illustrated in FIG. 6 may be performed by the processor (e.g., the processor 400 of FIG. 4) of the electronic device (e.g., the electronic device 200 of FIGS. 2 and 3). For example, the memory of the electronic device 200 (e.g., the memory 440 of FIG. 4) may store instructions that, when executed, cause the processor 400 to perform all or some of the operations illustrated in FIG. 6.

Figure 7:
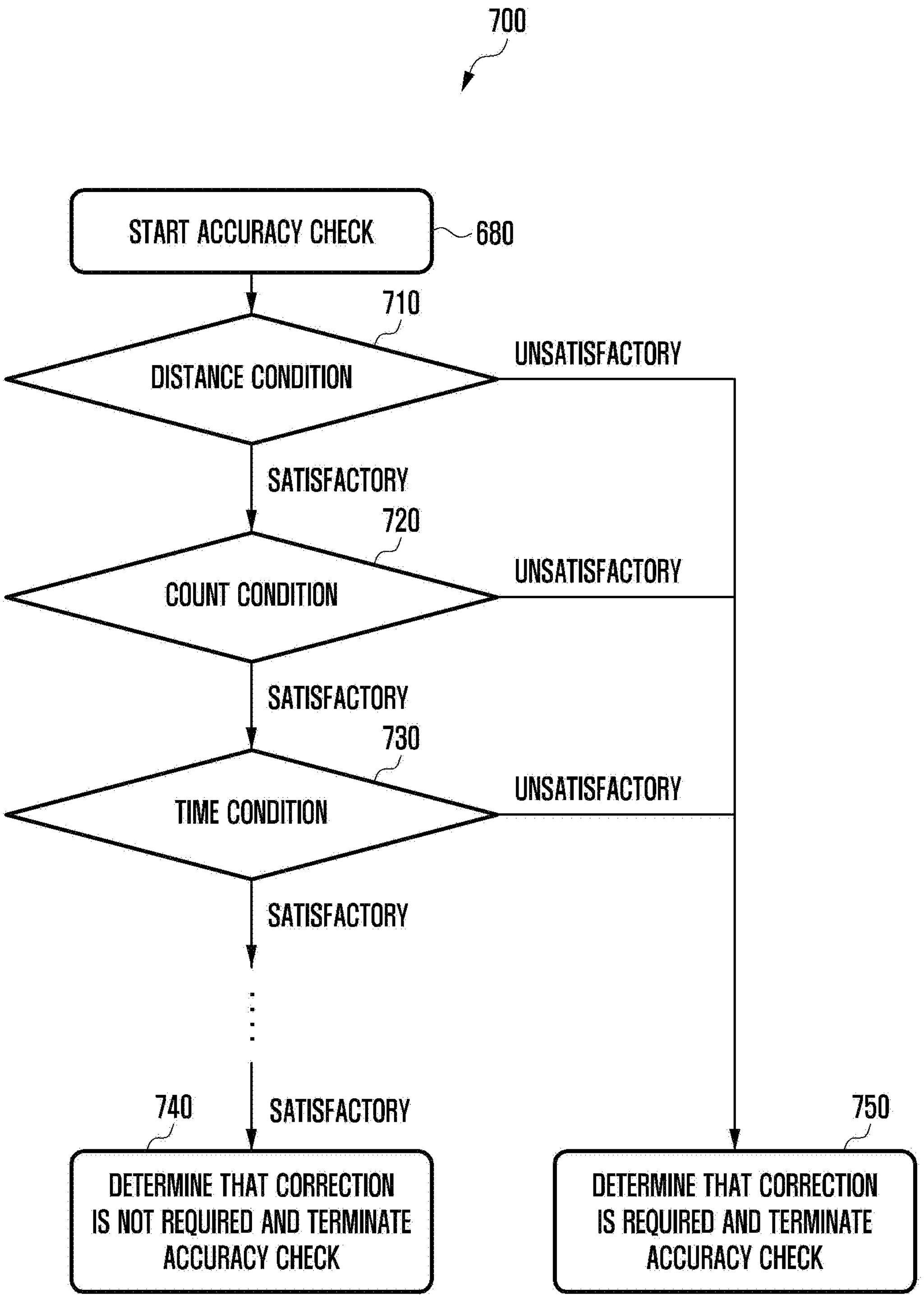
FIG. 7 is a diagram illustrating a method of identifying whether coordinates of a finger need to be corrected by an electronic device (e.g., an AR device) according to an embodiment of the disclosure.

FIG. 7 is a diagram 700 illustrating a method of identifying whether coordinates of a finger need to be corrected by an electronic device (e.g., an AR device) according to an embodiment of the disclosure.

Referring to FIGS. 3, 4, and 7, in operation 680, an accuracy measurement unit 420 of a processor 400 of an electronic device 200 (e.g., the AR device) may start an accuracy check of a hand tracker 410.

In operation 710, the processor 400 may determine whether a preset distance condition satisfies accuracy measurement criteria.

When the preset distance condition does not satisfy the accuracy measurement criteria as a result of the determination in operation 710, in operation 750, the processor 400 may determine that an accuracy correction is required and terminate the accuracy check.

In the meantime, when the preset distance condition satisfies the accuracy measurement criteria as the result of the determination in operation 710, in operation 720, the processor 400 may determine whether a count condition satisfies the accuracy measurement criteria. For example, the processor 400 may compare a fail count to a target count to determine whether the fail count exceeds the target count.

When the fail count does not exceed the target count as a result of the determination in operation 720, in operation 750, the processor 400 may determine that the accuracy correction is required and terminate the accuracy check.

In the meantime, when the fail count exceeds the target count as the result of the determination in operation 720, in operation 730, the processor 400 may further identify for other conditions. For example, the processor 400 may determine whether a time condition is met. The processor 400 may determine whether the accuracy measurement is performed within a preset time.

In operation 730, when the time condition is not satisfied, the processor 400 may determine that the accuracy correction is required and terminate the accuracy check.

On the other hand, when the time condition is satisfied as a result of the determination in operation 730, in operation 740, the processor 400 may determine that the accuracy correction is not required and terminate the accuracy check.

In the embodiment, there may be no difference (e.g., the error) or there may occur a difference (e.g., error) between the finger position (e.g., the coordinates) of the real user (e.g., the real user's finger position 530 in FIG. 5) and the position (e.g., coordinates) of the virtual finger image recognized by the electronic device 200 (e.g., the position 520 of the virtual finger image in FIG. 5). For example, when the user extends the index finger of the left hand and press a button to click a button object in the AR environment, the processor 400 may successfully click the button in one attempt when there is no difference (e.g., error) between the position (e.g., coordinates) of the real user's finger and the position (e.g., coordinates) of the virtual finger image.

For example, when there is a difference (e.g., error) between the position (e.g., coordinates) of the real user's finger and the position (e.g., coordinates) of the virtual finger image, the same movement may be repeated multiple times (e.g., 5 to 10 times) because there is no response to the click of the button.

For example, the processor 400 may determine (e.g., determine whether the count condition is satisfied in operation 720) whether the same movement is repeated a preset count (e.g., 5 to 10 times) because there is the difference (e.g., error) between the position (e.g., coordinates) of the real user's finger and the position (e.g., coordinates) of the virtual finger image, such that there is no response to the click of the button. Here, the preset count may be 2 to 4, or may be 11 or more. The processor 400 may detect the number of repetitions of the user's motion to press the button to determine whether the accuracy correction is required. When the processor 400 determines that the accuracy correction is required (e.g., determines that the correction is required in operation 750), the processor 400 may receive input from the user indicating whether the user desires to correct the accuracy of the hand tracker 410. When the user desires to correct the accuracy of the hand tracker 410, the processor 400 may perform an operation to measure the accuracy of the hand tracker 410 (e.g., the operation of measuring the accuracy of the hand tracker in FIG. 8).

In the embodiment, there may occur a difference (e.g., an error) between the real user's finger position (e.g., the real user's finger position 530 in FIG. 5) and the position of the virtual finger image recognized by the electronic device 200 (e.g., the position 520 of the virtual finger image in FIG. 5). To move to home in the AR environment, the user may extend the index finger of the right hand to press the home button. When the user extends the index finger of the right hand to press the home button to move to home in the AR environment, the processor 400 may record coordinates of the index finger of the right hand at the time of entering the home button and may record the coordinates of the index finger of the right hand the preset count (e.g., 5 to 10 times) of the movement that the user presses the home button with the index finger of the right hand. The processor 400 may determine whether the recorded coordinates of the finger deviates by a preset distance (e.g., 3 centimeters) or more from the coordinates of the button.

For example, when the recorded coordinates of the finger deviate by the preset distance (e.g., 3 centimeters) or more from the coordinates of the button, the processor 400 may determine that the accuracy correction of the hand tracker 410 is required. When the processor 400 determines that the accuracy correction is required, the processor 400 may receive input from the user indicating whether the user desires to correct the accuracy of the hand tracker 410. When the user desires to correct the accuracy of the hand tracker 410, the processor 400 may perform an operation to measure the accuracy of the hand tracker 410 (e.g., the operation to measure the accuracy of the hand tracker in FIG. 8).

At least some of the operations illustrated in FIG. 7 may be omitted. Before or after at least some of the operations illustrated in FIG. 7, at least some of the operations described herein with reference to other drawings in the document may be added and/or inserted. All or some of the operations illustrated in FIG. 7 may be performed by the processor (e.g., the processor 400 of FIG. 4) of the electronic device (e.g., the electronic device 200 of FIGS. 2 and 3). For example, the memory of the electronic device 200 (e.g., the memory 440 of FIG. 4) may store instructions that, when executed, cause the processor 400 to perform all or some of the operations illustrated in FIG. 7.

Figure 8:
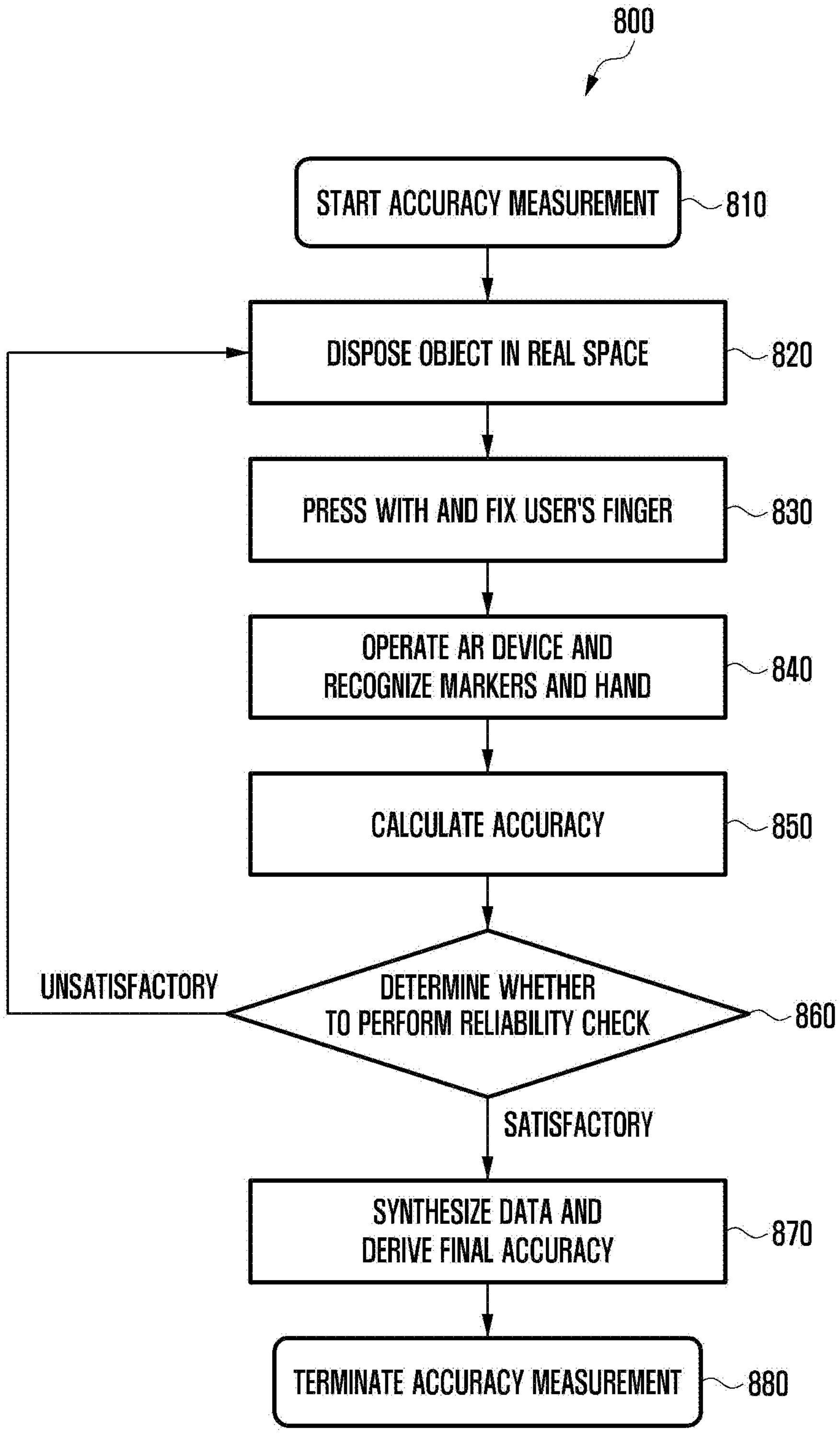
FIG. 8 is a diagram illustrating a method of measuring the accuracy of a hand tracker of an electronic device (e.g., an AR device), according to an embodiment of the disclosure.
Figure 9:
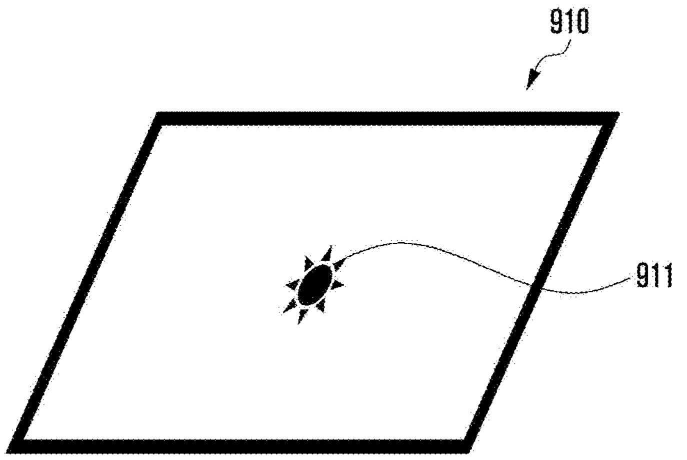
FIG. 9 is a diagram illustrating displaying a picture for user recognition and a plurality of markers on a screen (e.g., a planar space) of an electronic device (e.g., a smartphone, or a tablet personal computer (PC)) according to an embodiment of the disclosure.
Figure 9:
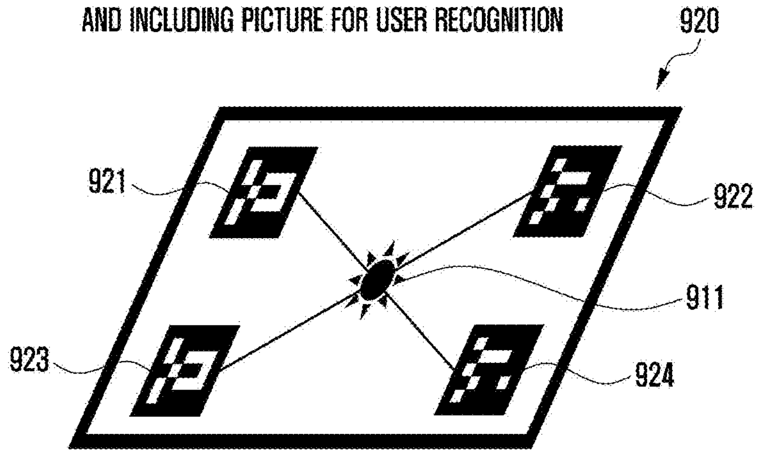
Figure 9:
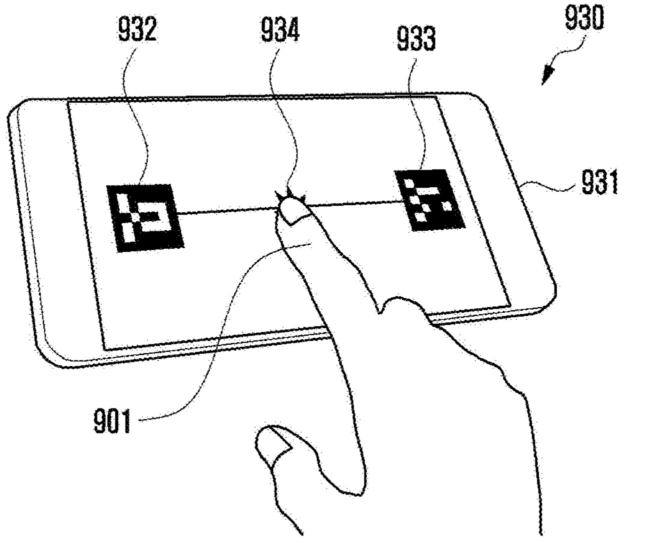

FIG. 8 is a diagram 800 illustrating a method of measuring accuracy of a hand tracker of an electronic device (e.g., the AR device) according to an embodiment of the disclosure. FIG. 9 is a diagram illustrating displaying a picture for user recognition and a plurality of markers on a screen (e.g., a planar space) of an electronic device (e.g., a smartphone, or a tablet PC) according to an embodiment of the disclosure.

Referring to FIGS. 3, 4, 8, and 9, in operation 810, an accuracy measurement unit 420 of a processor 400 of an electronic device 200 (e.g., the AR device) may start measuring an accuracy of a hand tracker 410.

In operation 820, the electronic device (e.g., the electronic device 101 of FIG. 1) may display (e.g., dispose) an object (e.g., a picture of a touch position and at least one marker) recognizable to the user in a planar space 910 (e.g., a screen 920 of a display or a printout) that is recognizable by the electronic device 200 (e.g., the AR device). As an example, the object may include a picture 911 indicating the position to be touched by the user's finger and/or a plurality of markers 921, 922, 923, and 924 for coordinate correction. Only the picture 911 may be displayed in the planar space 910, or the picture 911 and the plurality of markers 921, 922, 923, and 924 may be displayed on the screen 920 of the display.

For example, the picture 911 indicating the position to be touched by a user's finger 901 may be displayed in the center of the screen 920 of the display, and the four markers 921, 922, 923, and 924 for coordinate correction may be displayed at four corners of the screen 920 of the display.

As another example, a picture 934 indicating the position to be touched by the user's finger 901 may be displayed in the center of a screen 931 of a smartphone 930, and two markers 932 and 933 may be displayed on the left and right sides of the screen 931 of the smartphone 930.

As an example, the markers may be used for robust recognition of a planar space (e.g., a screen of a display).

For example, an object (e.g., a picture of a touch position and at least one marker) may be displayed (e.g., disposed) on a plane, such as a screen of an electronic device (e.g., the electronic device 101 of FIG. 1) (e.g., smartphone, tablet PC, or monitor) that includes a display (e.g., the display module 160 of FIG. 1).

As another example, an object (e.g., a picture of a touch position and at least one marker) may be displayed (e.g., disposed) on a plane, such as a printout.

In the embodiment, when the display of the object proceeds again because a reliability condition is not satisfied, the position of the object (e.g., the picture of the touch position and at least one marker) may be changed and displayed (e.g., disposed) again.

Figure 10:
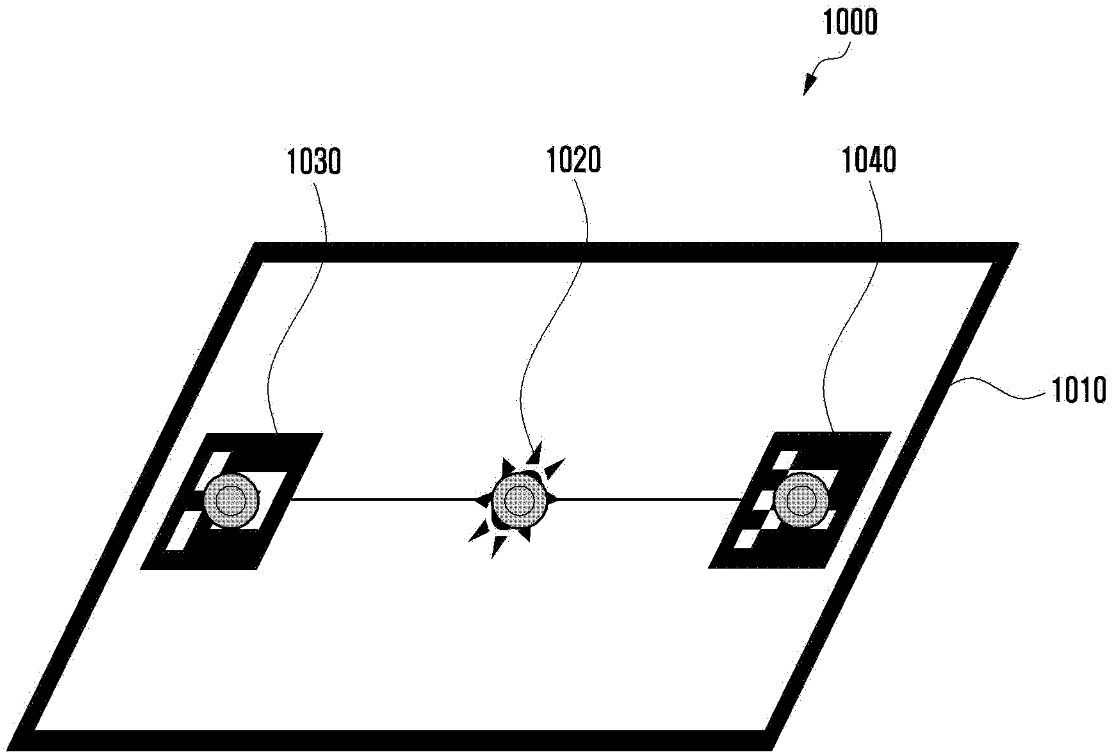
FIG. 10 is a diagram illustrating a 1:1 correspondence of three dimensional (3D) coordinates with an object displayed on a display screen according to an embodiment of the disclosure.

FIG. 10 is a diagram 1000 illustrating a 1:1 correspondence of 3D coordinates with an object displayed on a display screen according to an embodiment of the disclosure.

Referring to FIGS. 8 and 10, in operation 830, the user's finger pressing and fixing motions may be performed. For example, the processor (e.g., the processor 400 of FIG. 4) may be connected through communication with the electronic device (e.g., the electronic device 101 of FIG. 1) to cause a screen 1010 of the display to display an object (e.g., a picture 1020 of the touch position) and a plurality of markers 1030 and 1040 for user recognition. The processor 400 may generate 3D coordinates that correspond 1:1 to the positions of the picture 1020 and the plurality of markers 1030 and 1040 displayed on the screen 1010 of the display.

Figure 11:
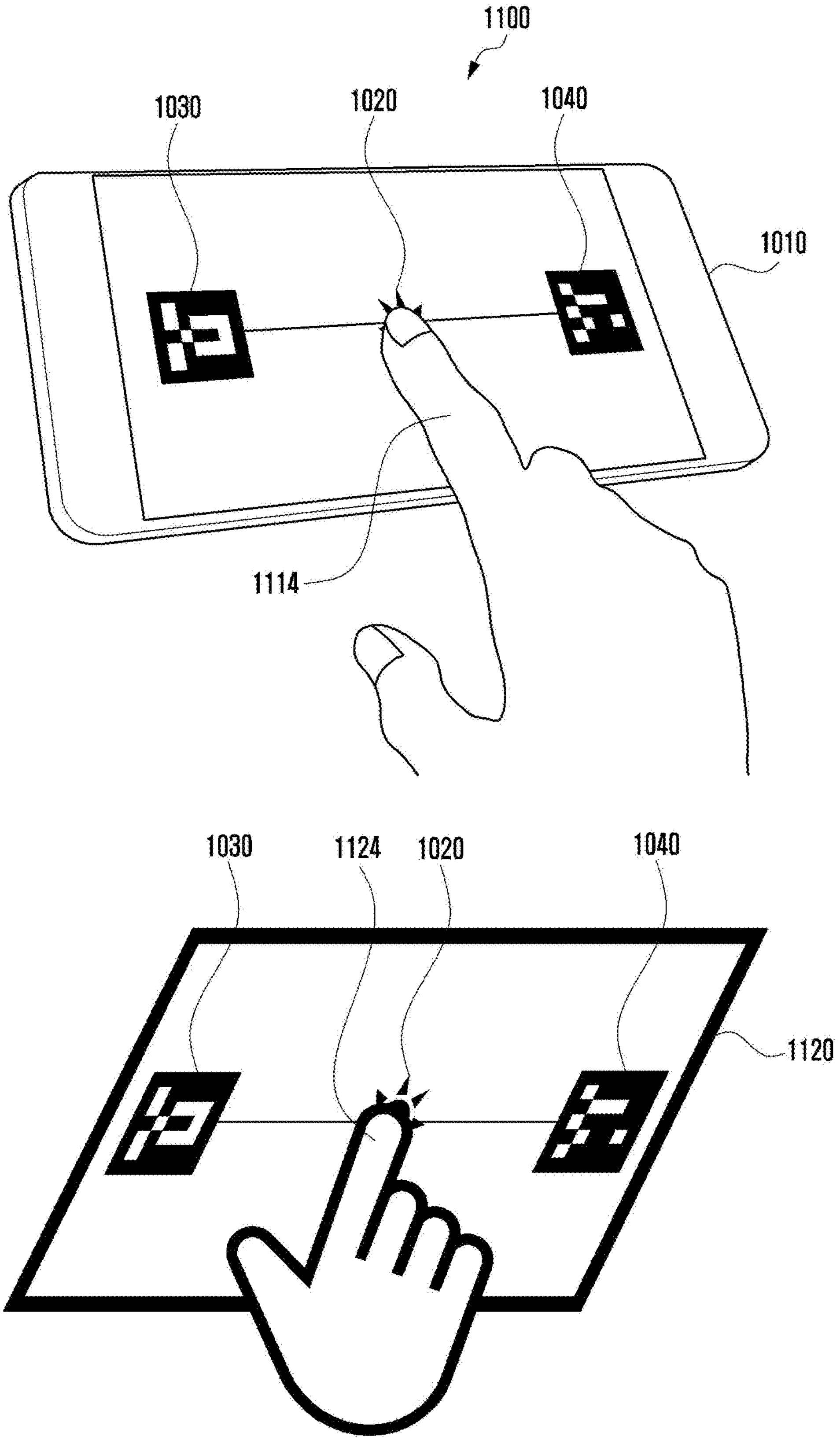
FIG. 11 is a diagram illustrating generating virtual data on an electronic device (e.g., an AR device) when touching a picture displayed on a screen (e.g., in a planar space) of an electronic device (e.g., a smartphone, or a tablet PC) according to an embodiment of the disclosure.

FIG. 11 is a diagram 1100 illustrating generating virtual data on an electronic device (e.g., an AR device) when touching a picture displayed on a screen (e.g., in a planar space) of an electronic device (e.g., a smartphone, or a tablet PC) according to an embodiment of the disclosure.

Referring to FIGS. 8 to 11, a state in which the picture for user recognition is in contact with a real user's finger 1114 is created. For example, a state in which the real user's finger 1114 touches the picture 1020 in the touch position displayed on the screen 1010 of the display is created. For example, the user may press the picture 1020 displayed on the screen 1110 of the display with the real user's finger 1114 and fix the finger for a period of time.

The processor (e.g., the processor 400 in FIG. 4) of the electronic device (e.g., the electronic device 200 in FIGS. 2 and 3) (e.g., the AR device) may recognize the real user's finger 1114 that touched the picture 1020 in the touch position displayed on the screen 1110 of the display and the plurality of markers 1030 and 1040.

For example, the processor 400 may generate data of the user's hand (e.g., an image of the user's hand) based on the recognition results of the real user's finger 1114 and the plurality of markers 1030, 1040.

As an example, the processor 400 may display a virtual user's finger image 1124 of a virtual user's finger touching the picture 1020 at the touch position and the plurality of markers 1030 and 1040 on a screen 1120 in the AR environment based on the data of the user's hand.

Figure 12:
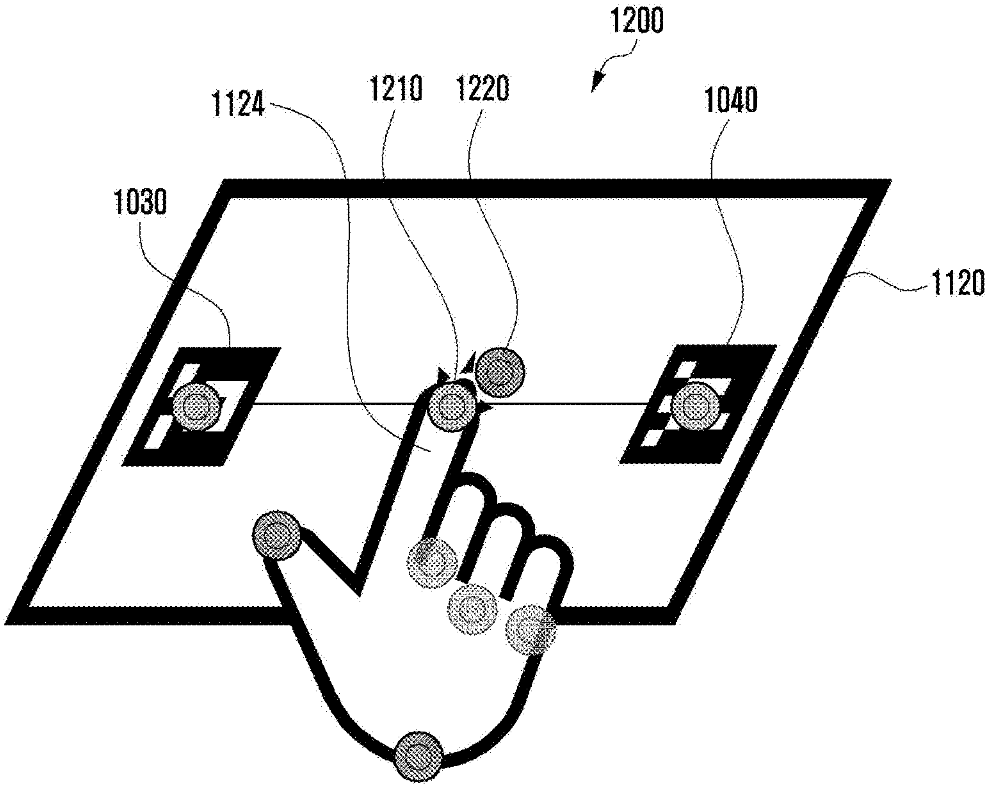
FIG. 12 is a diagram illustrating an electronic device (e.g., an AR device) recognizing an AR marker and a user's finger according to an embodiment of the disclosure.
Figure 12:
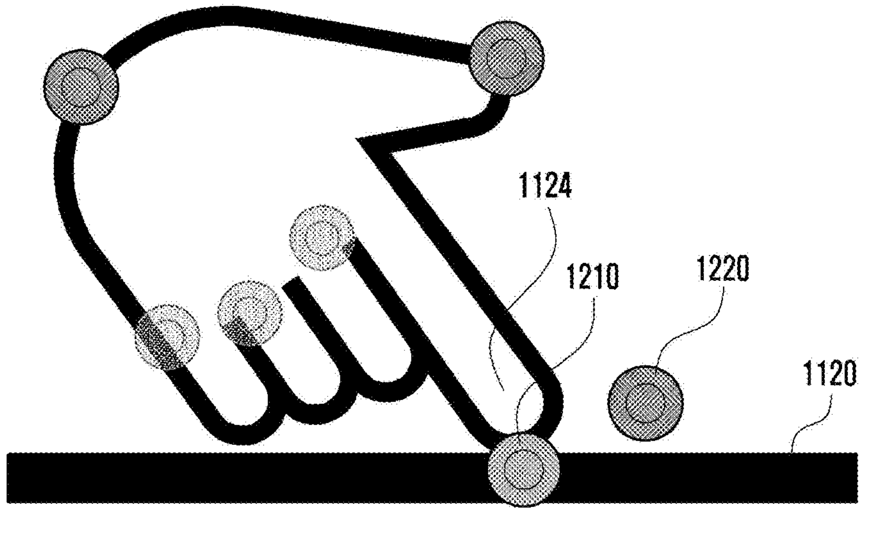

FIG. 12 is a diagram 1200 illustrating an electronic device (e.g., an AR device) recognizing an AR marker and a user's finger according to an embodiment of the disclosure.

Referring to FIGS. 8 to 12, in operation 840, a processor (e.g., the processor 400 of FIG. 4) may operate the AR device and perform recognition of a marker and hand.

For example, the processor 400 may recognize the user's finger (e.g., the real user's finger 1114 in FIG. 11) that has touched the plurality of markers 1030 and 1040 and the picture of the touch position displayed in the center of the screen (e.g., the picture 1020 of the touch position in FIG. 11).

For example, the processor 400 may calculate coordinates of the picture 1020 of the touch position displayed in the center of the screen (e.g., coordinates 1210 of the position touched by the real user's finger) and coordinates 1220 of the position touched by the virtual user's finger image 1124 based on the plurality of markers 1030 and 1040. Here, there may occur a difference (e.g., error) between the coordinates 1210 of the position touched by the real user's finger and the coordinates generated by the hand tracker (e.g., the hand tracker 410 in FIG. 4). That is, there may occur a difference (e.g., an error) between the coordinates 1210 of the position touched by the real user's finger and the coordinates 1220 of the virtual user's finger image 1124 generated by the hand tracker 410.

Figure 13:
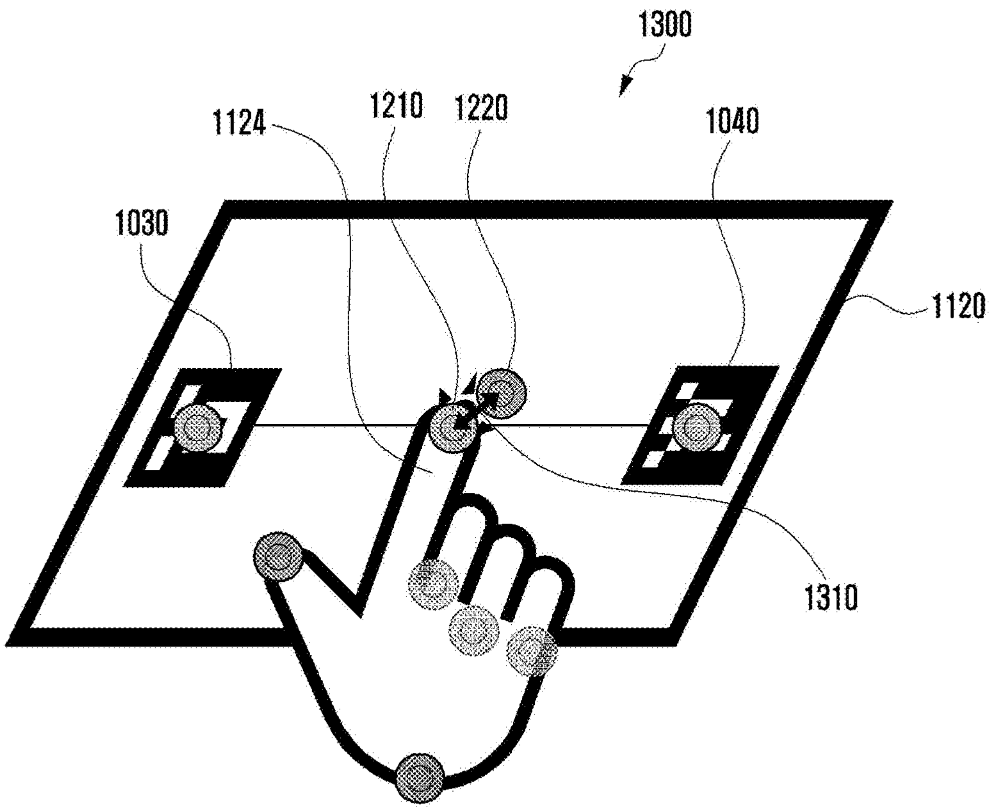
FIG. 13 is a diagram illustrating measuring accuracy of recognizing a user's finger on an electronic device (e.g., an AR device) according to an embodiment of the disclosure.
Figure 13:
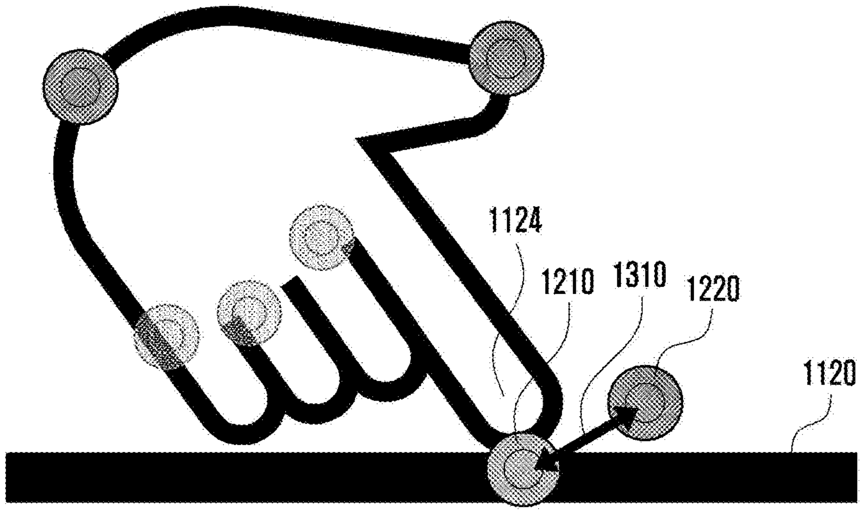

FIG. 13 is a diagram 1300 illustrating measuring accuracy of recognizing a user's finger on an electronic device (e.g., an AR device) according to an embodiment of the disclosure.

Referring to FIGS. 8 to 13, in operation 850, an accuracy measurement unit (e.g., the accuracy measurement unit 420 of FIG. 4) of a processor (e.g., the processor 400 of FIG. 4) may perform a calculation of accuracy of the coordinates of the position touched by the user's finger recognized through a hand tracker (e.g., the hand tracker 410 of FIG. 4).

For example, the processor 400 may measure the accuracy of the finger position (e.g., the coordinates) by calculating a distance difference 1310 between the coordinates 1210 of the position touched by the real user and the coordinates 1220 of the virtual user's finger image 1124 generated by the hand tracker (e.g., the hand tracker 410 in FIG. 4).

As such, by displaying the picture 1020 of the touch position and the plurality of markers 1030 and 1040 in a planar space (e.g., a display screen or printout) that is recognizable by the electronic device 200 (e.g., the AR device), the coordinates of the position touched by the user's finger may be matched 1:1 with the three-dimensional coordinates in the AR environment. The electronic device 200 may measure the accuracy of the finger position (e.g., the coordinates) by one to one matching the coordinates of the position touched by the user's finger with the three-dimensional coordinates in the AR environment.

In operation 860, the processor 400 may determine whether to perform a reliability check. For example, when a determination condition for performing the reliability check is not satisfied, the processor 400 may return to operation 820 and perform subsequent operations. A specific example of the reliability check will be described with reference to FIG. 14.

When the determination condition for performing the reliability check is satisfied, in operation 870, the processor 400 may synthesize the data to determine the accuracy of the position (e.g., coordinates) of the finger and derive final accuracy of the finger position (e.g., the coordinates).

In operation 880, the processor 400 may terminate measuring the accuracy of the finger position (e.g., the coordinates).

At least some of the operations illustrated in FIGS. 8 to 13 may be omitted. Before or after at least some of the operations illustrated in FIGS. 8 to 13, at least some of the operations described herein with reference to other drawings in the document may be added and/or inserted. All or some of the operations illustrated in FIGS. 8 to 13 may be performed by the processor (e.g., the processor 400 of FIG. 4) of the electronic device (e.g., the electronic device 200 of FIGS. 2 and 3). For example, the memory of the electronic device 200 (e.g., the memory 440 of FIG. 4) may store instructions that, when executed, cause the processor 400 to perform all or some of the operations illustrated in FIGS. 8 to 13.

Figure 14:
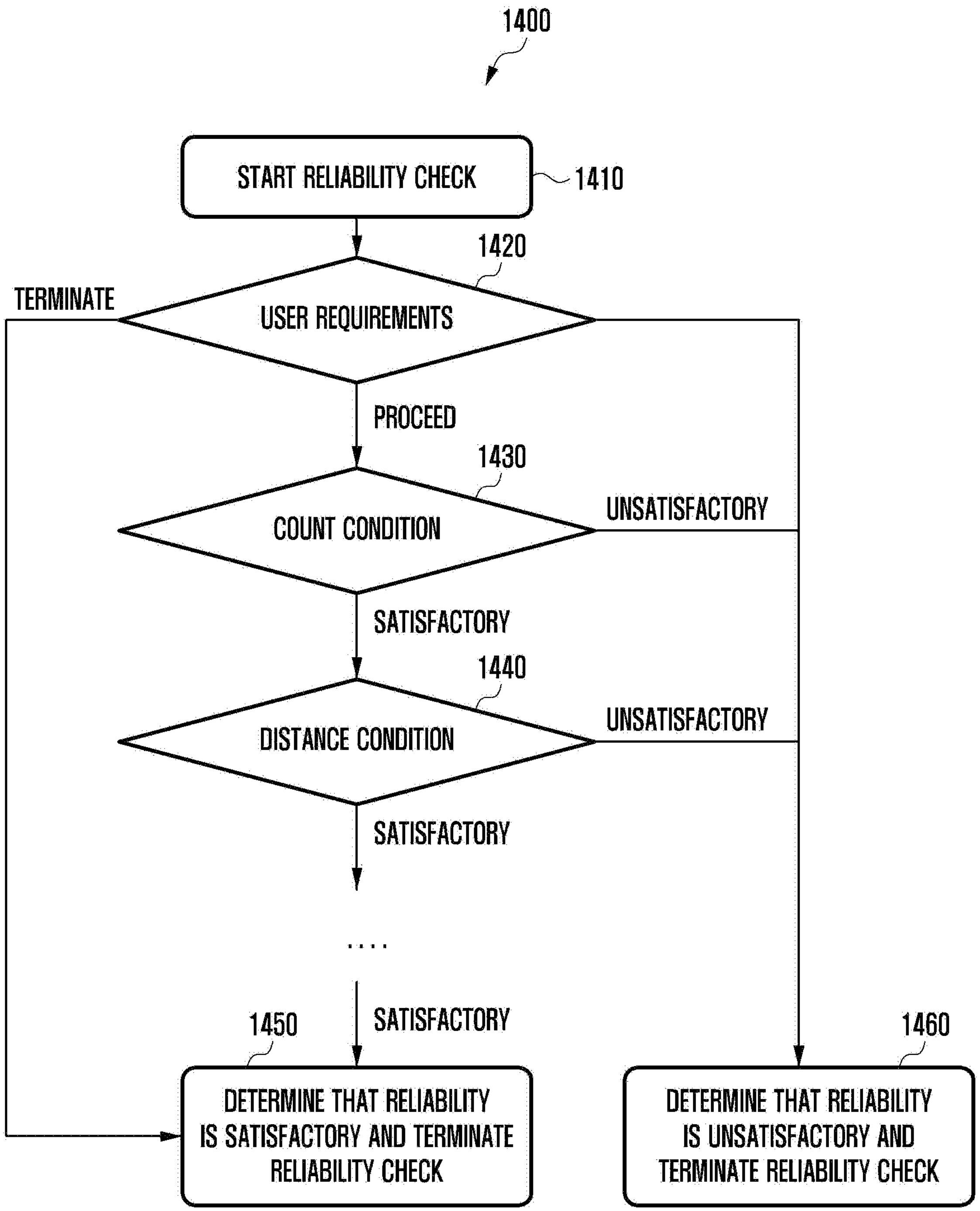
FIG. 14 is a diagram illustrating checking reliability of recognizing a user's finger by an electronic device (e.g., an AR device) according to an embodiment of the disclosure.

FIG. 14 is a diagram 1400 illustrating checking a reliability of recognizing a user's finger by an electronic device (e.g., an AR device) according to an embodiment of the disclosure.

Referring to FIGS. 8 and 14, in operation 1410, an accuracy measurement unit (e.g., the accuracy measurement unit 420 of FIG. 4) of a processor (e.g., the processor 400 of FIG. 4) may start a reliability check for the accuracy of the position (e.g., the coordinates) of the user's finger generated by a hand tracker (e.g., the hand tracker 410 of FIG. 4).

In operation 1420, the processor 400 may determine whether user's requirements to check reliability of the accuracy of the finger position (e.g., the coordinates) generated by the hand tracker 410 are satisfied. For example, the user's requirements may include whether to proceed with repeated reliability checks for the accuracy of the finger position (e.g., the coordinates). The processor 400 may present a query (or a selection menu) to the user via the user interface to identify whether the user wishes to proceed with repeated reliability checks for the accuracy of the finger position (e.g., the coordinates) generated by the hand tracker 410, and may determine whether the user wishes to proceed with repeated reliability checks for the accuracy based on the results of the user's selection. When the user does not wish to proceed with the repeated reliability check for the accuracy of the finger position (e.g., the coordinates) generated by the hand tracker 410 as a result of the determination in operation 1420, in operation 1450, the processor 400 may determine that the conditions for the reliability check for the accuracy of the finger position (e.g., the coordinates)

have been satisfied, and may terminate the reliability check for the accuracy of the finger position (e.g., the coordinates).

When the user wishes to proceed with the repeated reliability check for the accuracy of the finger position (e.g., the coordinates) generated by the hand tracker 410 as a result of the determination in operation 1420, in operation 1430, the processor 400 may determine a count condition. For example, the processor 400 may compare an accuracy reliability check try count and a target count to determine whether the accuracy reliability check try count exceeds the target count.

When the accuracy reliability check try count exceeds the target count as a result of the determination in operation 1430, in operation 1460, the processor 400 may determine that the reliability for the accuracy of the finger position (e.g., the coordinates) is unsatisfactory and terminate the reliability check for the accuracy of the finger position (e.g., the coordinates).

When the accuracy reliability check try count does not exceed the target count as a result of the determination in operation 1430, in operation 1440, the processor 400 may compare the distance difference 1310 between the coordinates 1210 of the position touched by the real user and the coordinates 1220 of the virtual user's finger image 1124 generated by the hand tracker 410 to a preset distance condition.

For example, the distance difference 1310 between the coordinates 1210 of the position touched by the real user and the coordinates 1220 of the virtual user's finger image 1124 is within the preset distance condition, the processor 400 may determine that the reliability of the accuracy of the finger position (e.g., the coordinates) is satisfactory and may terminate the reliability check for the accuracy of the finger position (e.g., the coordinates).

For example, when the measurement of the coordinates 1220 of the virtual user's finger image 1124 is repeated multiple times, the processor 400 may calculate a standard deviation of the distance difference 1310 between the coordinates 1210 of the position touched by the real user and the coordinates 1220 of the virtual user's finger image 1124 measured multiple times.

For example, the processor 400 may compare the standard deviation of the distance difference 1310 between the coordinates 1210 of the position touched by the real user and the coordinates 1220 of the virtual user's finger image 1124 measured multiple times to a preset distance condition. When the standard deviation of the distance difference 1310 is within the preset distance, in operation 1450, the processor 400 may determine that the reliability for the accuracy of the finger position (e.g., the coordinates) is satisfactory and terminate the reliability check for the accuracy of the finger position (e.g., the coordinates).

As another example, when the standard deviation of the distance difference 1310 exceeds the preset distance, in operation 1460, the processor 400 may determine that the reliability for the accuracy of the finger position (e.g., the coordinates) is unsatisfactory and terminate the reliability check for the accuracy of the finger position (e.g., the coordinates).

In the embodiment, the processor 400 may present a query (or a selection menu) to the user via the user interface to determine whether the user needs to correct the accuracy of the hand tracker 410, and may determine whether the user needs to correct the accuracy of the hand tracker 410 based on the results of the user's selection. For example, when the processor 400 determines that the user wants to directly correct the accuracy of the hand tracker 410, the processor 400 may activate a function to perform accuracy correction of the hand tracker 410 via the user interface to enable the accuracy correction of the finger position (e.g., the coordinates) to be performed.

In the embodiment, the accuracy correction unit of the processor 400 (e.g., accuracy correction unit 430 in FIG. 4) may perform the accuracy correction of the hand tracker 410. For example, upon entering the accuracy correction phase of the hand tracker 410, the electronic device 200 may cause an object for user recognition (e.g., the picture 1020 of the touch position in FIG. 10, and the plurality of markers 1030 and 1040 in FIGS. 11 to 13) which the user may press with the finger to be displayed on a display of a communicatively connected external electronic device (e.g., a smartphone).

For example, when the object for user recognition (e.g., the picture 1020 of the touch position in FIG. 10, and the plurality of markers 1030 and 1040 in FIGS. 11 to 13) which the user may press with the finger is displayed on the display of the electronic device (e.g., the smartphone), the processor 400 of the electronic device 200 (e.g., the AR device) may cause a guide message to be displayed to encourage the user to touch the object with the finger.

For example, when the user touches the object for user recognition (e.g., the picture 1020 of the touch position in FIG. 10, and the plurality of markers 1030 and 1040 in FIGS. 11 to 13) with the finger, the processor 400 of the electronic device 200 (e.g., the AR device) may recognize the user's finger and the object for user recognition (e.g., the picture 1020 of the touch position in FIG. 10, and the plurality of markers 1030 and 1040 in FIGS. 11 to 13).

For example, the processor 400 of the electronic device 200 (e.g., the AR device) may recognize the user's finger and the object for user recognition (e.g., the picture 1020 of the touch position in FIG. 10, and the plurality of markers 1030 and 1040 in FIGS. 11 to 13) to obtain AR coordinates of the portion touched by the finger. The processor 400 of the electronic device 200 (e.g., the AR device) may calculate a difference between the coordinates of the portion touched by the finger and coordinates of the knuckle of the hand that touched, and may record the coordinates in the memory (e.g., the memory 440 of FIG. 4). The processor 400 of the electronic device 200 (e.g., the AR device) may record a gesture of the finger and current user information in the memory (e.g., the memory 440 of FIG. 4).

For example, the processor 400 of the electronic device 200 (e.g., the AR device) may identify whether the reliability condition is satisfied by using the stored coordinates. When the reliability condition is not satisfied, the processor 400 may re-enter the first step of accuracy correction, and dispose the object in a different position from the previous position again, and perform the operations described with reference to FIGS. 8 to 14. When the reliability condition of the hand tracker 410 are satisfied, the processor 400 of the electronic device 200 (e.g., the AR device) may store a final accuracy value based on the stored data and notify the user that the accuracy correction is complete.

Figure 15:
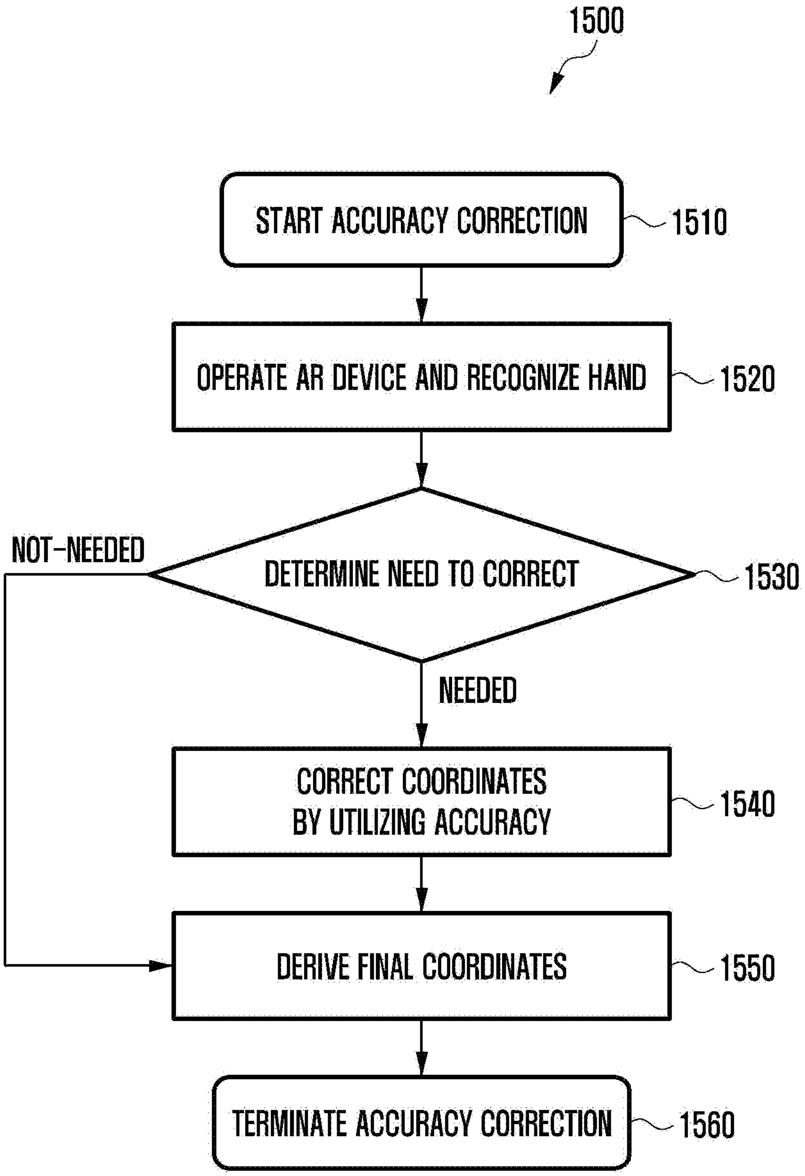
FIG. 15 is a diagram illustrating correcting coordinates of a user's finger by an electronic device (e.g., an AR device) according to an embodiment of the disclosure.

FIG. 15 is a diagram 1500 illustrating correcting coordinates of a user's finger by an electronic device (e.g., an AR device) according to an embodiment of the disclosure.

Referring to FIGS. 3, 4, and 15, in operation 1510, a processor 400 of an electronic device 200 (e.g., the AR device) may start correcting the accuracy of the finger position (e.g., the coordinates) generated by a hand tracker 410.

In operation 1520, the processor 400 may perform operations for recognizing the user's finger (e.g., the finger position (e.g., the coordinates) in FIG. 5) and recognizing the finger position (e.g., the coordinates) of the user. For example, the processor 400 may recognize the finger position (e.g., the coordinates) based on data of the user's hand (e.g., the image of the user's hand) input via a camera or sensors operable by the AR device.

For example, the processor 400 may calculate coordinates corresponding to finger position through computations, such as image processing or deep learning, based on the recognized data of the user's hand (e.g., the image of the user's hand).

In operation 1530, the processor 400 may determine a need to correct the finger position (e.g., the coordinates) generated by the hand tracker 410.

Figure 16:
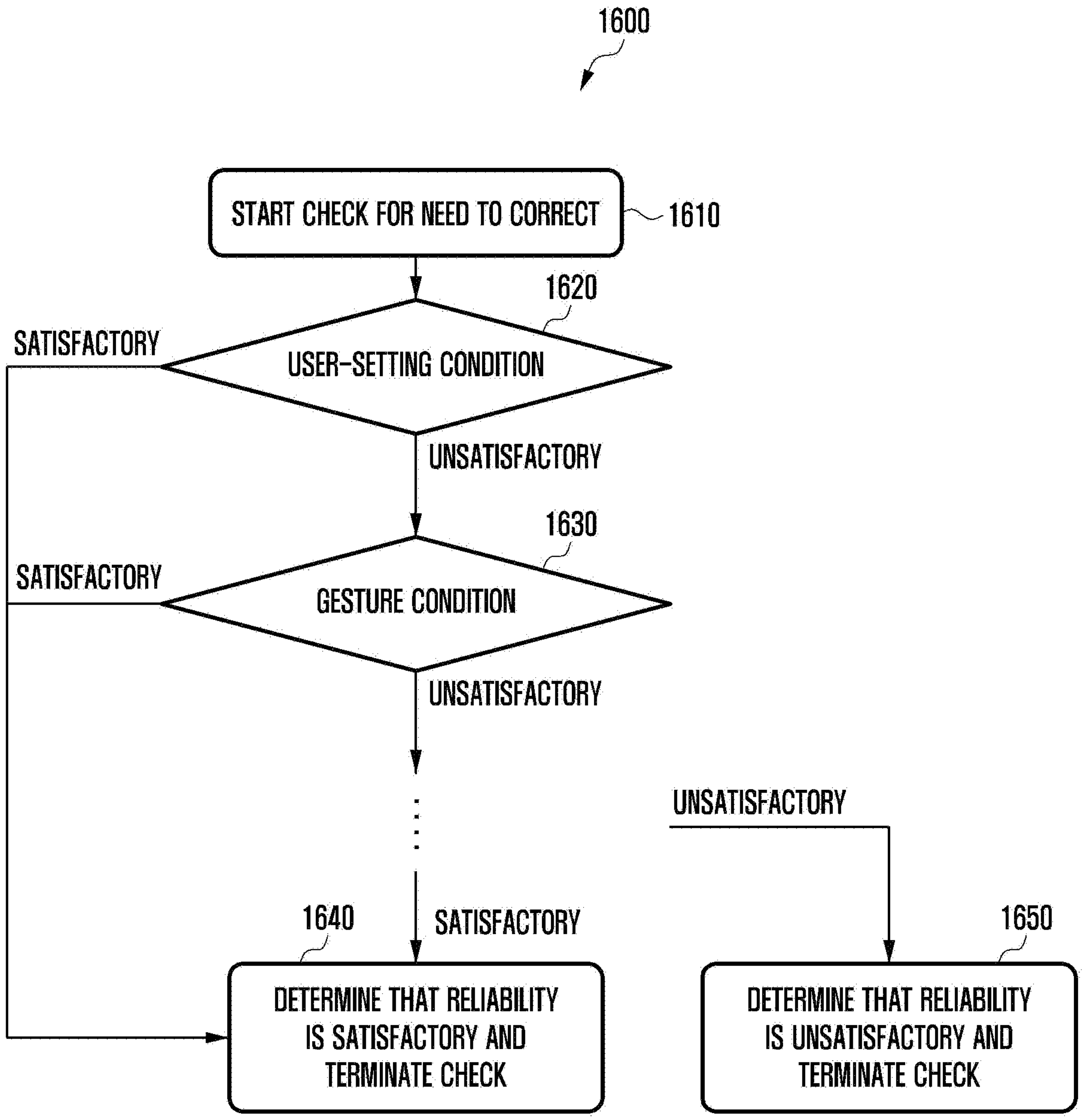
FIG. 16 is a diagram illustrating a method of determining a need to correct coordinates of a user's finger by an electronic device (e.g., an AR device) according to an embodiment of the disclosure.

FIG. 16 is a diagram 1600 illustrating a method of determining a need to correct coordinates of a user's finger by an electronic device (e.g., an AR device) according to an embodiment of the disclosure.

Referring now to FIG. 16, in operation 1610, a processor 400 may start a check for the need to correct the finger position (e.g., the coordinates) generated by a hand tracker 410.

In operation 1620, the processor 400 may determine a user-setting condition. For example, the processor 400 may determine whether the recognized user's hand shape is a hand shape set by the user.

When the recognized user's hand shape is the hand shape set by the user as a result of the determination in operation 1620, in operation 1640, the processor 400 may determine that reliability is satisfied and terminate the check for the need to correct the finger position (e.g., the coordinates).

When the recognized user's hand shape is not the hand shape set by the user as a result of the determination in operation 1620, in operation 1630, the processor 400 may determine whether a gesture of the user's finger satisfies a gesture condition. For example, the processor 400 may determine whether the gesture of the recognized user's finger is the same as the gesture of the used finger set during the accuracy correction.

When the gesture of the recognized finger is the same as the gesture of the used finger that was set during the accuracy correction of the finger position (e.g., the coordinates) as a result of the determination in operation 1630, in operation 1640, the processor 400 may determine that the reliability of the finger position (e.g., the coordinates) is satisfactory, and may terminate the check for the need to correct the finger position (e.g., the coordinates).

When the gesture of the recognized finger is not the same as the gesture of the finger set during the accuracy correction as a result of the determination in operation 1630, in operation 1650, the processor 400 may determine that the reliability of the finger position (e.g., the coordinates) is unsatisfactory, and may terminate the check for the need to correct the finger position (e.g., the coordinates).

Referring to FIGS. 2, 4, and 15, after the determination on the need to correct the finger position (e.g., the coordinates) is complete, in operation 1540, the processor 400 may perform a coordinate correction by utilizing the accuracy.

For example, the processor 400 may transform the currently calculated finger position (e.g., the coordinates) by using the previously measured accuracy difference to derive a finger position (e.g., the coordinates) that is the same (or similar) as the accuracy measurement result. In operation 1550, the processor 400 may derive final coordinates of the user's finger (e.g., the final coordinates 540 of FIG. 5). For example, the processor 400 may obtain the final coordinates 540 of the position of the user's finger (e.g., the real user's finger position 530 in FIG. 5) based on recognition data of the user's hand (e.g., the user's hand 510 in FIG. 5).

For example, the processor 400 may calculate the final coordinates 540 corresponding to the position of the user's finger (e.g., the real user's finger position 530 in FIG. 5) based on the data of the recognized user's hand 510 (e.g., the image of the user's hand) through computations, such as image processing or deep learning.

In operation 1560, the processor 400 may terminate the accuracy correction of the finger position (e.g., the coordinates) after calculating the final coordinates 540 corresponding to the real user's finger position 530.

At least some of the operations illustrated in FIGS. 14 to 16 may be omitted. Before or after at least some of the operations illustrated in FIGS. 14 to 16, at least some of the operations described herein with reference to other drawings in the document may be added and/or inserted. All or some of the operations illustrated in FIGS. 14 to 16 may be performed by the processor (e.g., the processor 400 of FIG. 4) of the electronic device (e.g., the electronic device 200 of FIGS. 2 and 3). For example, the memory of the electronic device 200 (e.g., the memory 440 of FIG. 4) may store instructions that, when executed, cause the processor 400 to perform all or some of the operations illustrated in FIGS. 14 to 16.

In the embodiment, an electronic device (e.g., the electronic device 200 of FIGS. 2 and 3) (e.g., an AR device) may recognize a user's hand and generate a finger position (e.g., coordinates) for the AR environment. Then, the electronic device 200 (e.g., the AR device) may identify whether the finger position (e.g., the coordinates) in the AR environment need to be corrected. When the finger position (e.g., the coordinates) in the AR environment needs to be corrected, the electronic device 200 (e.g., the AR device) may correct the finger position (e.g., the coordinates) in the AR environment to calculate the final coordinates 540 of the finger.

The electronic device 200 (e.g., the AR device) according to various embodiments of the disclosure may measure the accuracy of the hand tracker 410 on its own, without the separate measurement equipment, and calculate an error between the real user's finger position (e.g., the coordinates) and the finger position (e.g., the coordinates) in the AR environment. Based on the error between the real user's finger position (e.g., the coordinates) and the finger position (e.g., the coordinates) in the AR environment, the electronic device 200 (e.g., the AR device) may correct the finger position (e.g., the coordinates) in the AR environment to increase the user's AR experience.

An electronic device (e.g., the electronic device 200 of FIGS. 2 and 3) according to various embodiments of the disclosure, that is, an AR device that provides an augmented reality (AR) experience to a user, may include sensor circuitry configured to recognize a user's finger, memory (e.g., the memory 440 of FIG. 4) storing one or more computer programs, and one or more processors communicatively coupled to the sensor circuitry (e.g., the processor 400 of FIG. 4) and the memory. The one or more computer programs include computer-executable instructions that, when executed by the one or more processors individually or collectively, cause the electronic device to, after a result of recognizing the user's finger is received from the sensor circuitry, determine whether there is accuracy correction data of coordinates of the user's finger, when there is the accuracy correction data of the coordinates of the user's finger, correct an accuracy of the coordinates of the user's finger, when there is no accuracy correction data of the coordinates of the user's finger, recognize the user's finger in an image acquired by the sensor circuitry and calculate the coordinates of the user's finger (or a hand of the user) in an AR environment based on data of the user's finger, and correct the coordinates of the user's finger in the AR environment.

According to the embodiment, when the accuracy of the coordinates of the user's finger in the AR environment needs to be corrected, the electronic device may determine whether a user wants to correct the accuracy of the coordinates of the user's finger in the AR environment. When the user wants to correct the accuracy of the coordinates of the user's finger in the AR environment, the electronic device may perform an accuracy measurement of the coordinates of the user's finger.

According to the embodiment, the electronic device may display a selection menu through a user interface for identifying whether the user wants to correct the accuracy of the coordinates of the finger in the AR environment. The electronic device may perform the accuracy measurement of the coordinates of the finger in the AR environment based on a result of a user's selection.

According to the embodiment, the electronic device may display, in a planar space, an object for user recognition that includes a picture of a touch position representing a position touched by the user's finger together with a plurality of markers for correcting the coordinates of the user's finger.

According to the embodiment, the electronic device may display the picture of the touch position and the plurality of markers on a screen of a display of an external electronic device (e.g., electronic device 102 or 104 of FIG. 1).

According to the embodiment, the electronic device may display the picture of the touch position in a center of the screen of the display, and display two markers on left and right sides of the screen of the display, or display four markers at four corners of the screen of the display.

According to the embodiment, the electronic device may calculate first coordinates touched by the user's finger based on a position of the picture of the touch position. The electronic device may calculate second coordinates of a virtual finger in the AR environment based on the plurality of markers and the data of the user's finger touching the picture at the touch position.

According to the embodiment, when the correction of the coordinates of the user's finger in the AR environment is required, the electronic device may calculate a difference between the first coordinates touched by the user's finger and the second coordinates touched by the virtual finger in the AR environment. The electronic device may correct the coordinates of the user's finger in the AR environment based on the difference between the first coordinates and the second coordinates.

According to the embodiment, the electronic device may measure accuracy of the coordinates of the user's finger in the AR environment based on the difference between the first coordinates touched by the user's finger and the second coordinates touched by the virtual finger in the AR environment. The electronic device may terminate the accuracy measurement when the difference between the first coordinates and the second coordinates is within a preset distance.

According to the embodiment, the sensor circuitry may include at least one camera and/or at least one radar.

An operating method performed by an electronic device (e.g., electronic device 200) according to various embodiments of the disclosure is an operating method of an electronic device 200 that provides a user with an augmented reality (AR) environment and may include: recognizing, by the electronic device via sensor circuitry of the electronic device, a user's finger; after receiving a result of recognizing the user's finger, determining, by the electronic device, whether there is accuracy correction data of coordinates of the user's finger, correcting, by the electronic device, the accuracy of the coordinates of the user's finger based on determining that there is the accuracy correction data of the coordinates of the user's finger, recognizing, by the electronic device, the user's finger in an image obtained by the sensor circuitry based on determining that there is no accuracy correction data of the coordinates of the user's finger and calculating, by the electronic device, the coordinates of the user's finger in the AR environment based on data of the user's finger, and correcting, by the electronic device, the coordinates of the user's finger in the AR environment.

According to the embodiment, the operating method may include, based on the accuracy of the coordinates of the user's finger in the AR environment needing to be corrected, determining, by the electronic device, whether a user wants to correct the accuracy of the coordinates of the user's finger in the AR environment, and based on determining that the user wants to correct the accuracy of the coordinates of the user's finger in the AR environment, performing, by the electronic device, an accuracy measurement of the coordinates of the user's finger.

According to the embodiment, the operating method may include, displaying, by the electronic device, a selection menu through a user interface for identifying whether the user wants to correct the accuracy of the coordinates of the user's finger in the AR environment. The operating method may include performing, by the electronic device, the accuracy measurement of the coordinates of the finger in the AR environment based on a result of a user's selection.

According to the embodiment, the operating method may include displaying, by the electronic device in a planar space, an object for user recognition that includes a picture of a touch position representing a position touched by the user's finger together with a plurality of markers for correcting the coordinates of the finger.

According to the embodiment, the operating method may include displaying, by the electronic device, the picture of the touch position and the plurality of markers on a screen of a display of an external electronic device.

According to the embodiment, the operating method may include displaying, by the electronic device, the picture of the touch position to be displayed in a center of the screen of the display. The operating method may include displaying, by the electronic device, two markers on left and right sides of the screen of the display, or displaying, by the electronic device, four markers at four corners of the screen of the display.

According to the embodiment, the operating method may include calculating, by the electronic device, first coordinates touched by the user's finger based on a position of the picture of the touch position. The operating method may include calculating, by the electronic device, second coordinates of a virtual finger in the AR environment based on the plurality of markers and the data of the user's finger touching the picture at the touch position.

According to the embodiment, the operating method may include, based on the correction of the coordinates of the user's finger in the AR environment being required, calculating, by the electronic device, a difference between the first coordinates touched by the user's finger and the second coordinates touched by the virtual finger in the AR environment. The operating method may include correcting, by the electronic device, the coordinates of the user's finger in the AR environment based on the difference between the first coordinates and the second coordinates.

According to the embodiment, the operating method may include measuring, by the electronic device, accuracy of the coordinates of the user's finger in the AR environment based on the difference between the first coordinates touched by the user's finger and the second coordinates touched by the virtual finger in the AR environment. The operating method may include terminating, by the electronic device, the accuracy measurement based on the difference between the first coordinates and the second coordinates being within a preset distance.

According to the embodiment, the operating method may include recognizing, by the electronic device, a picture of a touch position representing a position touched by a user's finger on a printout and a plurality of markers for correction of the coordinates of the user's finger on the printout. The operating method may include: calculating, by the electronic device, first coordinates touched by the user's finger based on a position of the picture of the touch position; and calculating, by the electronic device, second coordinates of a virtual finger in the AR environment based on the plurality of markers and the data of the user's finger touching the picture at the touch position. The operating method may include, based on the correction of the coordinates of the finger in the AR environment being required, calculating, by the electronic device, a difference between the first coordinates touched by the user's finger and the second coordinates touched by the virtual finger in the AR environment. The operating method may include correcting, by the electronic device, the coordinates of the user's finger in the AR environment based on the difference between the first coordinates and the second coordinates.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:

an image sensor;

memory storing instructions; and one or more processors communicatively coupled to the image sensor and the memory, wherein the one or more instructions, when executed by the one or more processors individually or collectively, cause the electronic device to:

transmit, to an external electronic device communicatively coupled to the electronic device, data for causing the external electronic device to display at least one object on a screen of a display of the external electronic device, the at least one object including a target image indicating a position to be touched by a user's finger and a plurality of markers for correcting coordinates of the user's finger, identify the plurality of markers displayed on the screen of the display of the external electronic device and the user's finger touching the target image via the image sensor, a determine first coordinates of a position touched by the user's finger based on the position of the target image and the plurality of markers, determine second coordinates of a virtual finger in an augmented reality (AR) environment based on the user's finger identified in an image obtained by the image sensor, determine a difference between the first coordinates and the second coordinates, and correct the second coordinates based on the difference between the first coordinates and the second coordinates to generate final coordinates of the virtual finger in the AR environment.

2. A method for operating an electronic device, the method comprising:

transmitting, to an external electronic device communicatively coupled to the electronic device, data for causing the external electronic device to display at least one object on a screen of the external electronic device, the at least one object including a target image indicating a touch position to be touched by a user's finger and a plurality of markers for correcting coordinates of the user's finger;

identifying the plurality of markers displayed on the screen of the external electronic device and the user's finger touching the target image via an image sensor of the electronic device;

determining a first coordinates of a position touched by the user's finger based on the position of the target image and the plurality of markers;

determining second coordinates of a virtual finger in an augmented reality (AR) environment based on the user's finger identified in an image obtained by the image sensor;

determining a difference between the first coordinates and the second coordinates; and correcting the second coordinates based on the difference between the first coordinates and the second coordinates to generate final coordinates of the virtual finger in the AR environment.

3. The electronic device of claim 1, wherein the one or more instructions, when executed by the one or more processors individually or collectively, further cause the electronic device to:

generate three-dimensional (3D) coordinates that correspond one-to-one to positions of the target image and the plurality of markers displayed on the screen of the display of the external electronic device.

4. The electronic device of claim 1, wherein the data transmitted to the external electronic device causes the external electronic device to display the target image in a center of the screen of the display, and display two markers on left and right sides of the screen of the display, or four markers at four corners of the screen of the display.

5. The electronic device of claim 1, wherein the one or more instructions, when executed by the one or more processors individually or collectively, further cause the electronic device to:

perform an accuracy measurement based on the difference between the first coordinates and the second coordinates, and terminate the accuracy measurement when the difference between the first coordinates and the second coordinates is within a preset distance.

6. The electronic device of claim 5, wherein the one or more instructions, when executed by the one or more processors individually or collectively, further cause the electronic device to:

in response to a standard deviation of the difference between the first coordinates and the second coordinates measured a plurality of times exceeding a preset distance, transmit, to the external electronic device, data for causing the external electronic device to display the at least one object at a position different from a previous position on the screen of the display, and re-perform the accuracy measurement.

7. The electronic device of claim 5, wherein the one or more instructions, when executed by the one or more processors individually or collectively, further cause the electronic device to:

in case that the accuracy measurement is repeated a plurality of times, determine a standard deviation of the difference between the first coordinates and the second coordinates measured the plurality of times, and determine that a reliability of the accuracy measurement is satisfactory in response to the standard deviation being within a preset distance.

8. The electronic device of claim 1, wherein the one or more instructions, when executed by the one or more processors individually or collectively, further cause the electronic device to:

after a result of identifying the user's finger is received from the image sensor, determine whether there is accuracy correction data of the coordinates of the user's finger, based on determining that there is the accuracy correction data, correct the second coordinates by using the accuracy correction data to generate the final coordinates of the virtual finger in the AR environment, and based on determining that there is no accuracy correction data, perform the determining of the first coordinates, the determining of the second coordinates, and the determining of the difference to generate the accuracy correction data.

9. The electronic device of claim 8, wherein the one or more instructions, when executed by the one or more processors individually or collectively, further cause the electronic device to:

determine whether accuracy correction is required based on whether a same movement by a user is repeated a preset count without a response to an operation in the AR environment, and in response to the same movement being repeated the preset count, determine that the accuracy correction is required.

10. The electronic device of claim 9, wherein the one or more instructions, when executed by the one or more processors individually or collectively, further cause the electronic device to:

determine whether coordinates of the user's finger recorded during the repeated same movement deviate by a preset distance or more from coordinates of an object in the AR environment targeted by the user, and in response to the coordinates of the user's finger deviating by the preset distance or more, determine that the accuracy correction is required.

11. The electronic device of claim 9, wherein the one or more instructions, when executed by the one or more processors individually or collectively, further cause the electronic device to:

in response to determining that the accuracy correction is required, display a selection menu through a user interface for identifying whether the user wants to perform the accuracy correction, and perform the accuracy correction based on a result of a user's selection.

12. The electronic device of claim 1, wherein the one or more instructions, when executed by the one or more processors individually or collectively, further cause the electronic device to:

determine whether an identified hand shape of a user is a hand shape set by the user during accuracy correction, and based on determining that the identified hand shape is not the hand shape set by the user, determine whether a gesture of the user's finger is the same as a gesture of the user's finger set during the accuracy correction, and based on determining that the gesture of the user's finger is not the same as the gesture set during the accuracy correction, determine that a reliability of the final coordinates is unsatisfactory.

13. The method of claim 2, further comprising:

generating three-dimensional (3D) coordinates that correspond one-to-one to positions of the target image and the plurality of markers displayed on the screen of the display of the external electronic device.

14. The method of claim 2, wherein the data transmitted to the external electronic device causes the external electronic device to display the target image in a center of the screen of the display, and display two markers on left and right sides of the screen of the display, or four markers at four corners of the screen of the display.

15. The method of claim 2, further comprising:

performing an accuracy measurement based on the difference between the first coordinates and the second coordinates; and terminating the accuracy measurement in response to the difference between the first coordinates and the second coordinates being within a preset distance.

16. The method of claim 15, further comprising:

in response to a standard deviation of the difference between the first coordinates and the second coordinates measured a plurality of times exceeding a preset distance, transmitting, to the external electronic device, data for causing the external electronic device to display the at least one object at a position different from a previous position on the screen of the display, and re-performing the accuracy measurement.

17. The method of claim 15, further comprising:

in case that the accuracy measurement is repeated a plurality of times, determining a standard deviation of the difference between the first coordinates and the second coordinates measured the plurality of times; and determining that a reliability of the accuracy measurement is satisfactory in response to the standard deviation being within a preset distance.

18. The method of claim 2, further comprising:

after receiving a result of identifying the user's finger, determining whether there is accuracy correction data of the coordinates of the user's finger;

based on determining that there is the accuracy correction data, correcting the second coordinates by using the accuracy correction data to generate the final coordinates of the virtual finger in the AR environment; and based on determining that there is no accuracy correction data, performing the determining of the first coordinates, the determining of the second coordinates, and the determining of the difference to generate the accuracy correction data.

19. The method of claim 18, further comprising:

determining whether accuracy correction is required based on whether a same movement by the user is repeated a preset count without a response to an operation in the AR environment; and in response to the same movement being repeated the preset count, determining that the accuracy correction is required.

20. The method of claim 2, further comprising:

determining whether an identified hand shape of the user is a hand shape set by the user during accuracy correction;

based on determining that the identified hand shape is not the hand shape set by the user, determining whether a gesture of the user's finger is the same as a gesture of the user's finger set during the accuracy correction; and based on determining that the gesture of the user's finger is not the same as the gesture set during the accuracy correction, determining that a reliability of the final coordinates is unsatisfactory.

* * * * *